US012170932B2

(12) United States Patent
Chen et al.

(10) Patent No.: US 12,170,932 B2
(45) Date of Patent: *Dec. 17, 2024

(54) WIRELESS BASED PRESENCE DETECTION

(71) Applicant: Comcast Cable Communications, LLC, Philadelphia, PA (US)

(72) Inventors: Tianwen Chen, McLean, VA (US); Hongcheng Wang, Arlington, VA (US); Hong Li, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,829

(22) Filed: May 23, 2023

(65) Prior Publication Data

US 2023/0292084 A1 Sep. 14, 2023

Related U.S. Application Data

(63) Continuation of application No. 17/712,892, filed on Apr. 4, 2022, now Pat. No. 11,700,505, which is a continuation of application No. 16/878,048, filed on May 19, 2020, now Pat. No. 11,330,396.

(51) Int. Cl.
*H04W 4/021* (2018.01)
*H04B 17/318* (2015.01)
*H04L 67/55* (2022.01)
*H04W 24/08* (2009.01)

(52) U.S. Cl.
CPC .......... *H04W 4/021* (2013.01); *H04B 17/318* (2015.01); *H04L 67/55* (2022.05); *H04W 24/08* (2013.01)

(58) Field of Classification Search
None
See application file for complete search history.

(56) References Cited

U.S. PATENT DOCUMENTS

| 9,179,343 | B2 | 11/2015 | Yang et al. |
| 9,432,965 | B2 | 8/2016 | Khemani et al. |
| 9,609,614 | B2 | 3/2017 | Ong et al. |
| 10,305,766 | B1 | 5/2019 | Zhang et al. |
| 10,310,079 | B1 | 6/2019 | Um et al. |
| 10,448,211 | B1 * | 10/2019 | Shen .................. G06K 7/10366 |
| 10,945,092 | B2 * | 3/2021 | Shen ...................... H04W 4/38 |

(Continued)

OTHER PUBLICATIONS

Gholampooryazdi, "Walking Speed detection from 5G Prototype System" (downloaded from Internet on Apr. 10, 2020).

(Continued)

*Primary Examiner* — Adolf Dsouza
(74) *Attorney, Agent, or Firm* — Banner & Witcoff, Ltd.

(57) ABSTRACT

Systems, apparatuses, and methods are described for presence detection of a wireless device in a sensing region. Communication parameters determined by a computing device over one or more periods may be used to generate criteria for determining the occurrence of enter events or leave events. The criteria may comprise, for values of one or more communication parameters, rates of change associated with movement into or out of the sensing region. The criteria may be compared against subsequent data associated with the communication parameters to determine if an enter event or a leave event has occurred.

56 Claims, 16 Drawing Sheets

(56) References Cited

U.S. PATENT DOCUMENTS

| | | |
|---|---|---|
| 2010/0304738 A1 | 12/2010 | Lim et al. |
| 2013/0046852 A1 | 2/2013 | Saxena et al. |
| 2014/0062309 A1 | 3/2014 | Kim |
| 2015/0126234 A1* | 5/2015 | Rodriguez ........ H04M 1/72412 |
| | | 455/457 |
| 2016/0006577 A1 | 1/2016 | Logan |
| 2017/0228774 A1 | 8/2017 | Sallas et al. |
| 2019/0005317 A1 | 1/2019 | Uhlemann |

OTHER PUBLICATIONS

Habaebi, et al., "RSSI-based Human Presence Detection System for Energy Saving Automation" (downloaded from Internet on Apr. 10, 2020).

Li, "Sensor Behavior Modeling and Algorithm Design for Intelligent Presence Detection in Nursery Rooms using Beacon" (downloaded from Internet on Apr. 10, 2020).

Marchenkov, et al., "User Presence Detection Based on Tracking Network Activity in SmartRoom" (downloaded from Internet on Apr. 10, 2020).

Zhang, et al., "WiDetect: Robust Motion Detection with a Statistical Electromagnetic Model" (downloaded from Internet on Apr. 10, 2020).

U.S. Appl. No. 16/856,720, filed Apr. 23, 2020, titled "Extended Reality Localization".

* cited by examiner nsWIRELESS BASED PRESENCE DETECTION

CROSS-REFERENCE

This application is a continuation of and claims priority to U.S. patent application Ser. No. 17/712,892, filed Apr. 4, 2022, which is a continuation of U.S. patent application Ser. No. 16/878,048, filed on May 19, 2020 (now U.S. Pat. No. 11,330,396), each of which is hereby incorporated by reference in its entirety.

BACKGROUND

Presence of a person in a home may be inferred based on a connection status of a wireless device associated with that person. If the wireless device connects to (e.g., joins a network associated with) an access point associated with the home, presence of the wireless device (and by inference, the associated person) may be assumed. Conversely, non-presence may be assumed based on the wireless device disconnecting from (e.g., leaving the wireless network associated with) the access point. However, connection and disconnection may sometimes be inaccurate predictors of presence.

SUMMARY

The following summary presents a simplified summary of certain features. The summary is not an extensive overview and is not intended to identify key or critical elements.

Methods, systems, and apparatuses are described for presence detection in a wireless sensing region. In contrast to basing detection on single occurrence of a possible connection or disconnection, multiple point sampling and analysis may be used to determine presence to reduce false detections. In a wireless environment, values for communication parameters may be gathered before and after a wireless device connection/disconnection. Those values may be used to generate criteria for determining, based on additional values for those communication parameters, whether a person carrying a wireless device is actually entering or leaving a premises or other sensing region. Values for any of one or more communication parameters may be used. For example, signal strength values may be analyzed to determine rates of change associated with arrival or departure from a premises. RF band switching by a wireless device may be tracked to determine whether the wireless device is using a band that may be associated with smaller distances from an access point or whether the wireless device is using a band that may be associated with larger distances from the access point. Numerous other communication parameters may also or alternatively be used.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
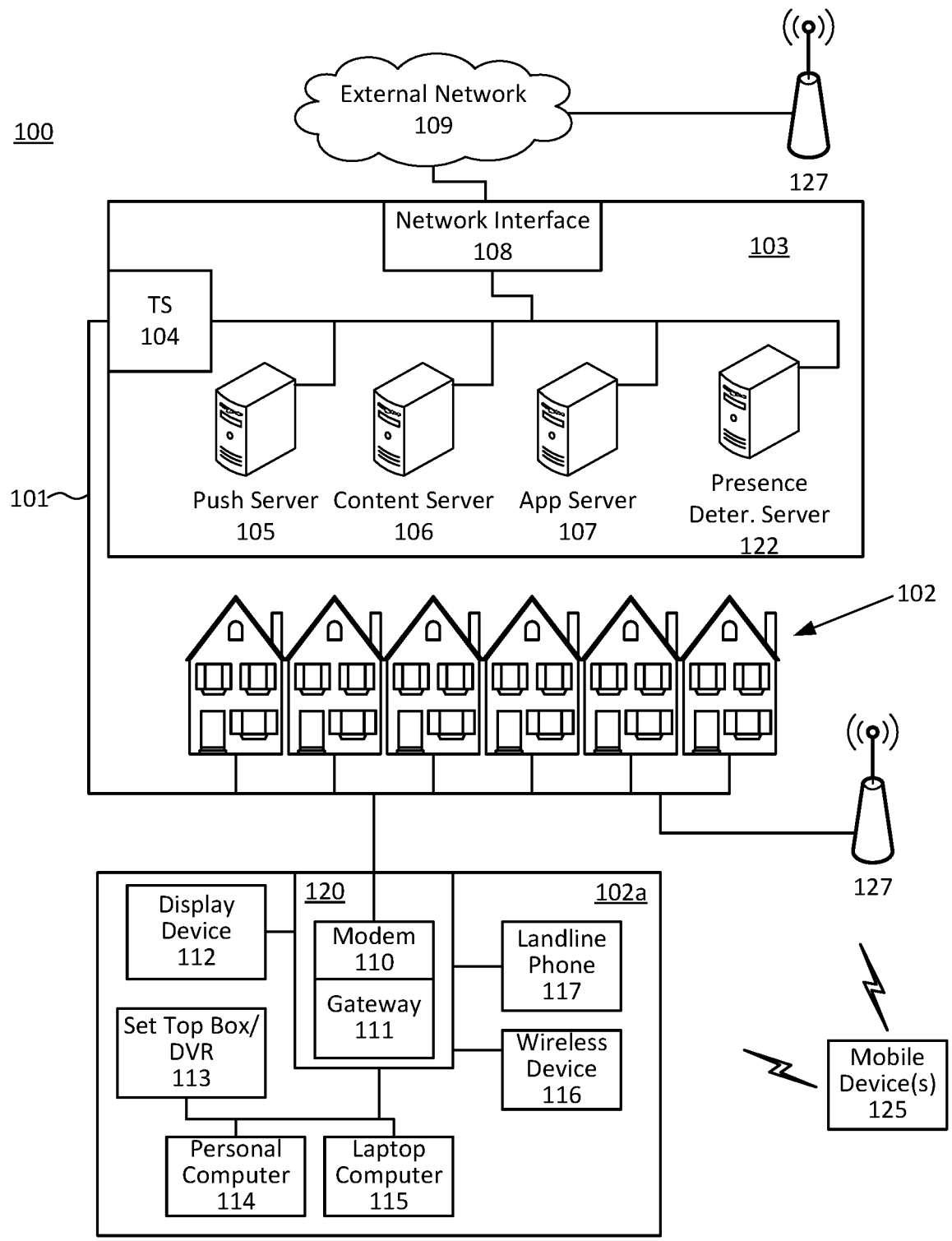
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107 and 122, and/or to manage communications between those devices and one or more external networks 109. Also or alternatively, servers (e.g., one or more of the servers 105-107 or 122) may be located at a data center and/or other facility different from the local office 103 and/or in the one or more networks 109. The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as a presence determination server 122 (described below), additional push, content, and/or application servers, and/or other types of servers. Although shown separately, the push server 105, the content server 106, the application server 107, the presence determination server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise, be a part of, be in communication with, and/or otherwise be associated with a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
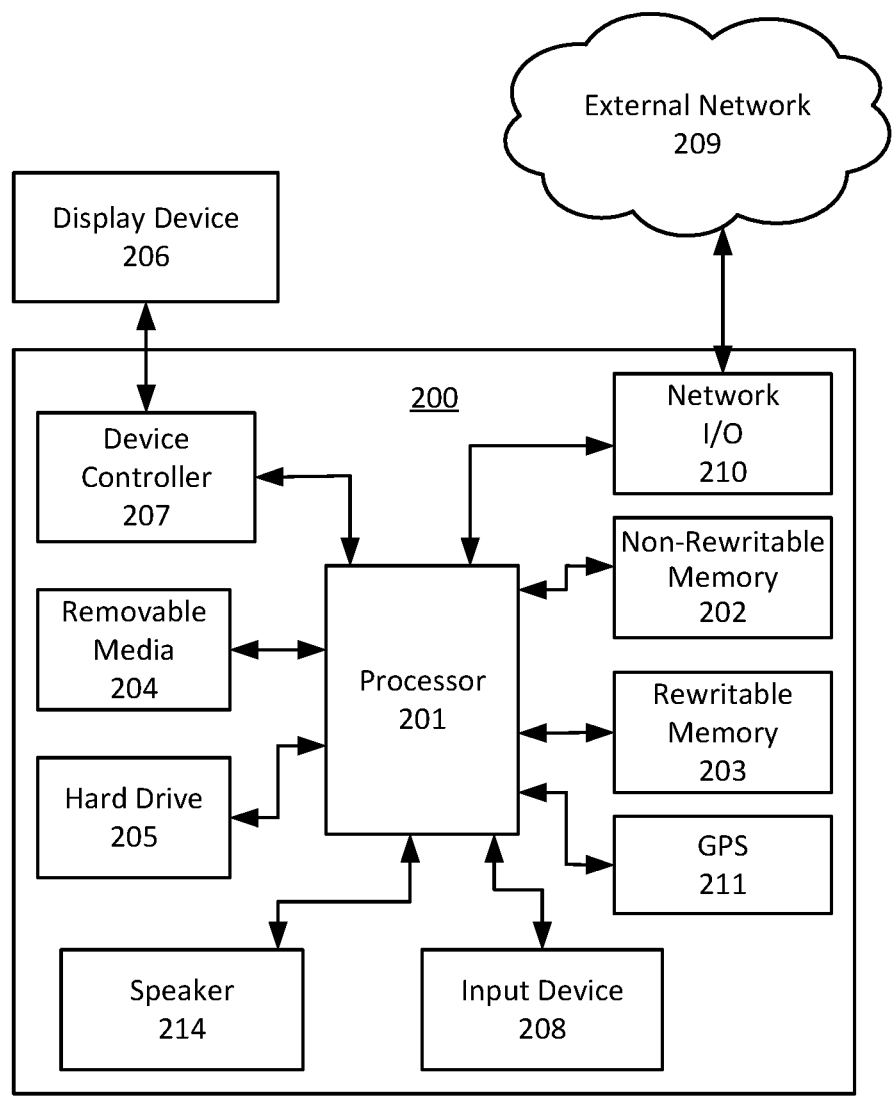
FIG. 2 shows example hardware elements of a computing device.
Figure 3:
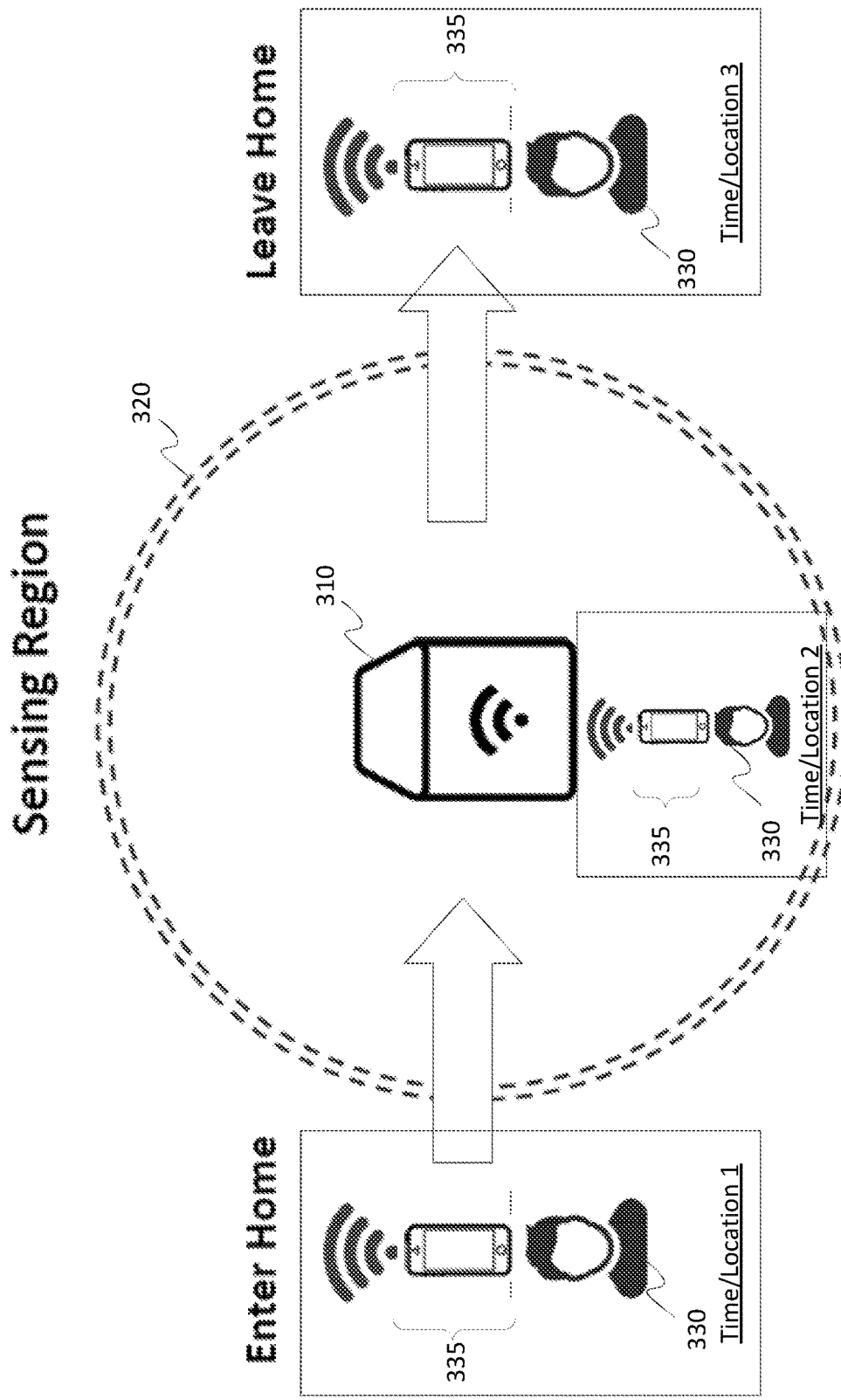
FIG. 3 shows an example of a wireless sensing region.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., computing devices, such as the computing device 310 in FIG. 3, configured to send or receive signal strength values, such as a Received Signal Strength Indicator (RSSI) value or computing devices for processing machine learning models). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random-access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or other transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Machine learning models may be executed by servers, mobile computing devices, or cloud services, or by any combination of such resources. Further, machine learning models may exist in a single processing resource or may be distributed across multiple such resources, including cloud resources.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Relying solely on connection or disconnection to determine presence may result in false determinations. For example, a wireless device may connect or disconnect for reasons unrelated to presence (e.g., if the wireless device is turned on or off, if a battery becomes discharged, etc.). As explained below, one or more rates of change of values of one or more communication parameters for wireless communications associated with a wireless device, and/or one or more other criteria associated with one more communication parameters, may be used for presence detection.

FIG. 3 shows an example wireless system 300. The wireless system 300 may comprise a computing device 310. The computing device 310 may comprise one or more gateways, wireless access points, or routers, and/or other computing devices configured to wirelessly communicate with devices (e.g., a wireless device 335) in a wireless network. The computing device 310 may comprise a simple wireless router, a stand-alone gateway, or a wireless extender, booster, repeater, or wireless hotspot and/or may comprise one or more wireless access points such as wireless access points 127 or the gateway 111. The computing device 310 may have an effective coverage area (e.g., a wireless network may extend over a coverage area), which is shown in FIG. 3 as a sensing region 320.

The sensing region 320 may exist within any area, structure, or region with or without a structure. For example, sensing region 320 may be associated with premises 102 or any other type of premises. A premises may comprise regions inside of a building or other structure and/or regions outside of a building or structure. Wireless system 300 may comprise one or more wireless devices, such as the wireless device 335, where the wireless device 335 may be any type of mobile device, as in the mobile device 125. FIG. 3 shows a user 330 carrying the wireless device 335 at three example different times/locations.

Time/location 1 shows the user 330 with the wireless device 335 outside the sensing region 320 at a first time. Time/location 2 shows, after time/location 1, where the user 330 with the wireless device 335 enters into the sensing region 320. Time/location 3 shows, after time/location 2, where the user 330 with the wireless device 335 leaves the sensing region 320. Although FIG. 3 shows entry into the sensing region 320 via a first location and exit from the sensing region 320 via a second location, entry and exit may occur via the same location and/or via other locations.

The wireless device 335 may be configured to wirelessly communicate with other wireless devices, such as computing device 310. Such communications may be controlled by the communications protocol being used by the wireless device 335 and the other wireless devices. Such communications may comprise data. That data may comprise values for communication parameters associated with the communications. For example, such communication parameters may comprise information regarding packet loss, coding metrics, communication channel characteristics, channel state information, and/or received signal strength indicators. The wireless devices and/or the computing device 310 may use this information to determine the most appropriate method of communication.

The computing device 310 may, for wireless communications received by the computing device 310 from the wireless device 335, calculate values for one or more communication parameters associated with those received wireless communications. For example, the computing device may determine Received Signal Strength Indicator (RSSI) values for wireless signals transmitted by the wireless device 335 and received by the computing device 310, may estimate channel state information (CSI) that comprises information regarding channel properties of a communication link from the wireless device 335 to the computing device 310 (e.g., information indicating how a signal is propagating from the wireless device 335 to the computing device 310 and/or that the signal is affected by scattering, fading, and/or power decay), and/or may otherwise determine communication parameter values.

For convenience, methods, systems, apparatuses, and/or computer-readable media are described herein based on examples in which a computing device such as the computing device 310 determines communication parameters for communications received from a wireless device such as the wireless device 335. Those determined values may be used by the computing device 310 and/or by other computing devices to perform one or more of the operations described herein. However, methods, systems, apparatuses, and/or computer-readable media such as those described herein may also or alternatively comprise, determine, and/or otherwise make use of communication parameter values determined by a wireless device (e.g., the wireless device 335) for communications received by the wireless device from another computing device (e.g., the computing device 310). Any wireless communications associated with a wireless device (e.g., communications received from the wireless device 335 by the computing device 310, communications received by the wireless device 335 from the computing device 310) may be used as part of or in connection with any of the operations described herein.

If the wireless device 335 is at time/location 1 or 3, as shown in FIG. 3, it may be outside of the sensing region 320, and unable to communicate with computing device 310. With no communication between the wireless device 335 and the computing device 310, there may be no communication signal between the wireless device 335 and the computing device 310.

If the wireless device 335 enters the sensing region 320, for example, at time/location 2, the wireless device 335 may be able to connect and communicate with the computing device 310. The closer the wireless device 335 comes to the computing device 310, the strength of signals, from the wireless device 335 and detected by the computing device 310 (and/or from the computing device 310 and detected by the wireless device 335), may increase.

If the wireless device 335 is at time/location 3, as shown in FIG. 3, it may again be outside of the sensing region 320, and may be unable to communicate with the computing device 310. If the wireless device 335 moves from time/location 2 to time/location 3, it may transition to being outside of the sensing region 320 and may disconnect from the computing device 310.

The movement of the wireless device 335 from the time/location 1 to time/location 2 may be referred to as an entry (or arrival) event—an entering into (or arrival at) the sensing region 320. The movement of the wireless device 335 from the time/location 2 to time/location 3 may be referred to as a leave (or departure) event—a leaving (or departing) the sensing region 320. The sensing region 320 may comprise a home. The sensing region 320 may also or alternatively comprise any other region inside or outside of a structure such as an office building, an outside space, a store, etc., for example the premises 102a as shown in FIG. 1. Further, the sensing region 320 may comprise a cell, a city block or a 3-mile diameter (e.g., if the computing device 310 comprises a 5G or LTE base station).

The strength of a signal from the wireless device 335 to the computing device 310 may be proportional to the distance between the devices. Thus, a signal between the devices (e.g., a signal from the wireless device 335 to the computing device 310, or vice versa) may gradually increase in strength as the wireless device 335 gets physically closer to the computing device 310, for example as the wireless device 335 moves from the location shown by the wireless device 335 at time/location 1 to the location shown by the wireless device 335 at time/location 2. Similarly, the strength of the signal between devices may gradually increase as the wireless device 335 enters the coverage area 320 via another location (e.g., while moving from location 3 to location 2). Conversely, the strength of the signal from the wireless device 335 to the computing device 310 (or vice versa) may gradually decrease in strength as the wireless device 335 gets physically further from the computing device 310, for example as the wireless device 335 moves from the location shown by the wireless device 335 at time/location 2 to the location shown by the wireless device 335 at time/location 3. Similarly, the strength of the signal between devices may gradually decrease as the wireless device 335 leaves the coverage area 320 via another location (e.g., while moving from location 2 to location 1).

Figure 5A:
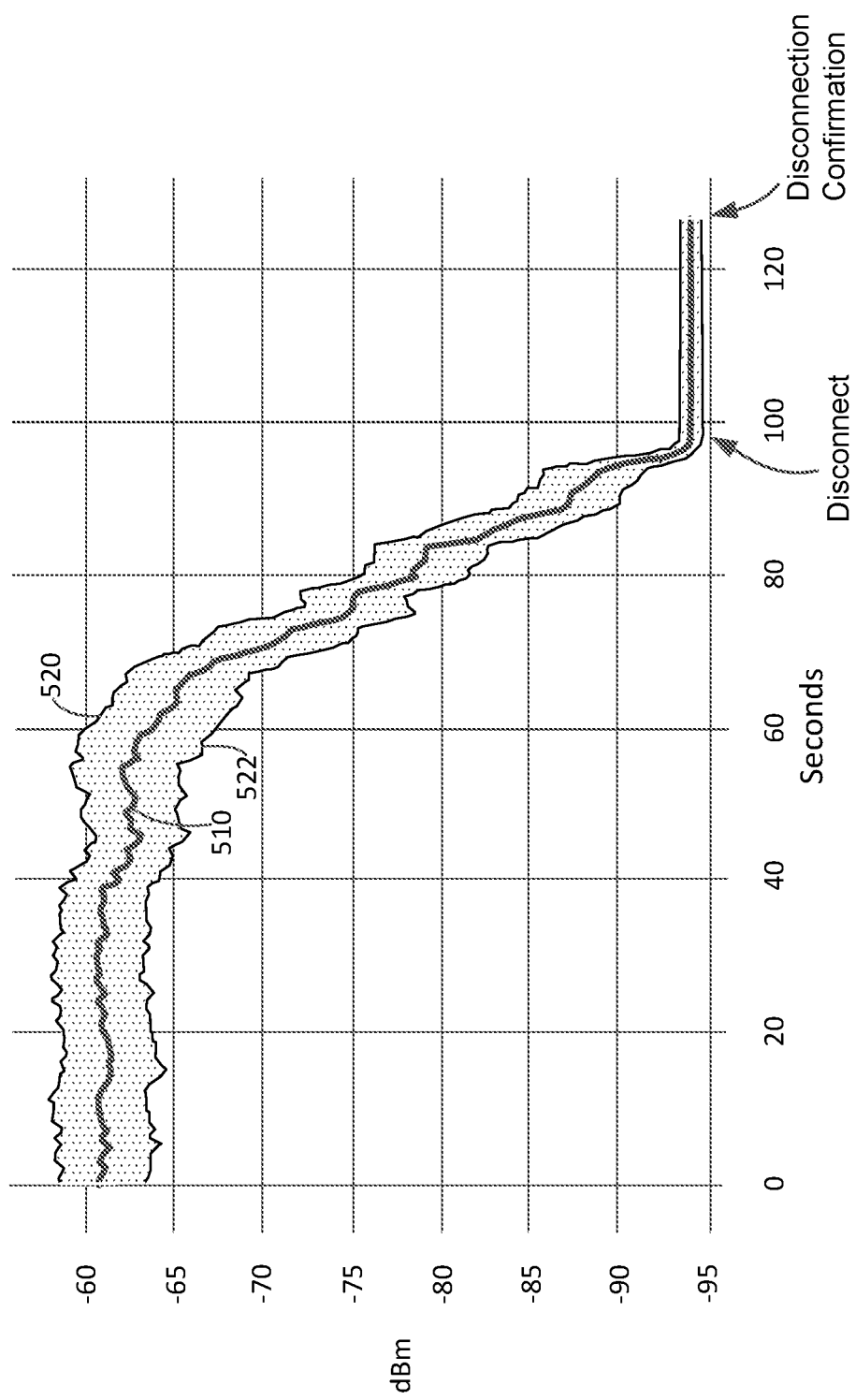
FIGS. 5A and 5B show examples of RSSI signal values over time during a leave event and an entry event, respectively.

For example, a gradual change in signal strength may be as shown in FIG. 5A, where there is an approximate signal strength change rate of 30 decibel-milliwatts (dBm) over a time period of 40 seconds, or 0.75 dBm/sec. If devices are close, for example, the computing device 310 may detect a signal strength of −50 dBm or greater indicating an excellent connection. Moving further apart, the computing device 310 may detect a signal strength between −50 dBm to −60 dBm indicating a good connection. Moving still further apart the computing device 310 may detect a signal strength between −60 dBm to −70 dBm indicating a fair connection, and if the computing device 310 detects a signal strength of less than −70 dBm such a connection may be considered weak, at −80 dBm the signal may be unreliable, and at −90 dBm or less the ability of connecting (and/or maintaining a connection) may be very low.

In contrast to the 0.75 dBm/sec signal strength change rate discussed above, a failure of a wireless device, for example, from a power loss, may result in a change rate of 20-60 dBm or more in a few seconds, resulting in a signal strength change rate between 10 dBm/sec (e.g., 20 dBm change over 2 seconds) and 60 dBm/sec (e.g., 60 dBm change over 1 second). Changes in received signal strength that are due to an increase in the distance between the wireless device 335 and the computing device 310 may tend to be at a slower rate. For example, assume a signal strength of −50 dBm at a distance of 20 feet between the wireless device 335 and the computing device 310 and a signal strength of −65 dBm at a distance of 60 feet between the wireless device 335 and the computing device 310, resulting in a change of −15 dBm as the distance between the wireless device 335 and the computing device 310 changes by 40 feet. For simplicity, a linear relationship between signal strength and distance may be assumed. If the wireless device 335 moves away from the computing device at speed of 3 mph (4.4 feet/sec, a moderate walking pace), a distance change of 40 feet would occur over approximately 9 seconds, resulting in a signal strength change rate of −15/9 dBm/sec, or −1.6 dBm/sec. If the walking rate was a slower pace of 1 mph (1.5 feet/sec), a distance change of 40 feet would occur over approximately 27 seconds, yielding signal strength change rate of approximately −0.6 dBm/sec. If instead of a walking speed, a speed of 10 mph is used (e.g., simulating a vehicle leaving a sensing region), this would result in traversing 40 feet in 2.7 seconds, resulting signal strength change rate of approximately −5.5 dBm/sec.

Figure 4A:
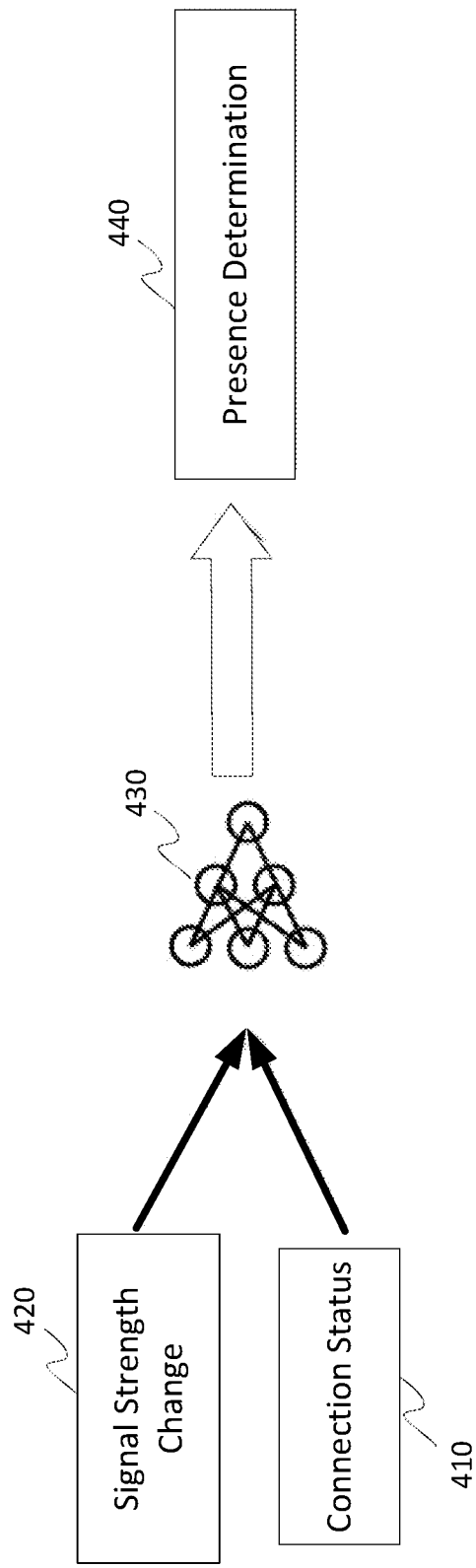
FIGS. 4A, 4B, and 4C show examples of machine learning models that may be used in connection with presence detection.

FIG. 4A shows an example of a presence detection operation that may use machine learning. The example shows the gathering of data, including connection status data 410 and signal strength change data 420. The connection status data 410 may indicate whether a wireless device is connected. Connection may, for example, comprise establishment of a wireless communication session between a wireless device and a computing device within a sensing region. A connection may, for example, comprise joining of a wireless network being managed/controlled by the computing device 310. The existence of a connection may indicate the presence of a connected wireless device within a sensing region. However, the absence of a connection may not be an accurate indicator of whether a wireless device has left a sensing region. As mentioned above, a wireless device may become disconnected from a computing device for a variety of reasons, for example the wireless device may be put into a standby mode, the wireless device may become disabled, a power source of the wireless device may become depleted, etc. Additional information can be used to improve determination of whether the wireless device may have left the sensing region. Such additional information may comprise, for example, changing levels of communication parameters, for example RSSI values associated with signals received from that wireless device, such as from the wireless device 335.

The signal strength change data 420 and the connection status data 410 may be input into a machine learning system 430. The machine learning system 430 may determine patterns of the signal strength changes, from the signal strength change data 420, to improve presence detections, resulting in the presence determination 440. The presence determination 440 may comprise criteria that may be used for determining presence based on additional communication parameter data, as described below. The machine learning system 430 may be used to develop criteria to distinguish an abrupt disconnection of a wireless device from a more gradual decrease in signal strength of a wireless device that may indicate the leaving of a wireless device from a sensing region. The machine learning system 430 may also or alternatively be used to determine and/or predict an entry event (e.g., a wireless device entering a sensing region) or a leave event (e.g., a wireless device leaving a sensing region). For convenience, entry events and leave events may be referred to generically as "entry/leave events." Detection of an entry/leave event may be used for the control of one or more functions. For example, if a leave event is detected based on a presence detection operation (e.g., such as shown in FIG. 4A), a security system may be armed based on the detection of the leave event. Also, or alternatively, and based on detection of an entry event, lights, appliances, heating/cooling, and/or other devices or systems may be turned on or off (e.g., based on messages, sent to a premises automation system, configured to cause an action). Also or alternatively, a detected entry/leave event may trigger a notification, for example, parents may be notified if a wireless device associated with children has arrived at or left a home.

A presence detection operation may use RSSI values. However, other communication parameters may also or alternatively be used by the machine learning system 430 to detect patterns associated with an entry/leave event. Such communication parameters may comprise, for example, information regarding packet loss, coding metric for channels, channel characteristics, channel state information, and/or any other information regarding wireless communications associated with a wireless device.

Figure 4B:
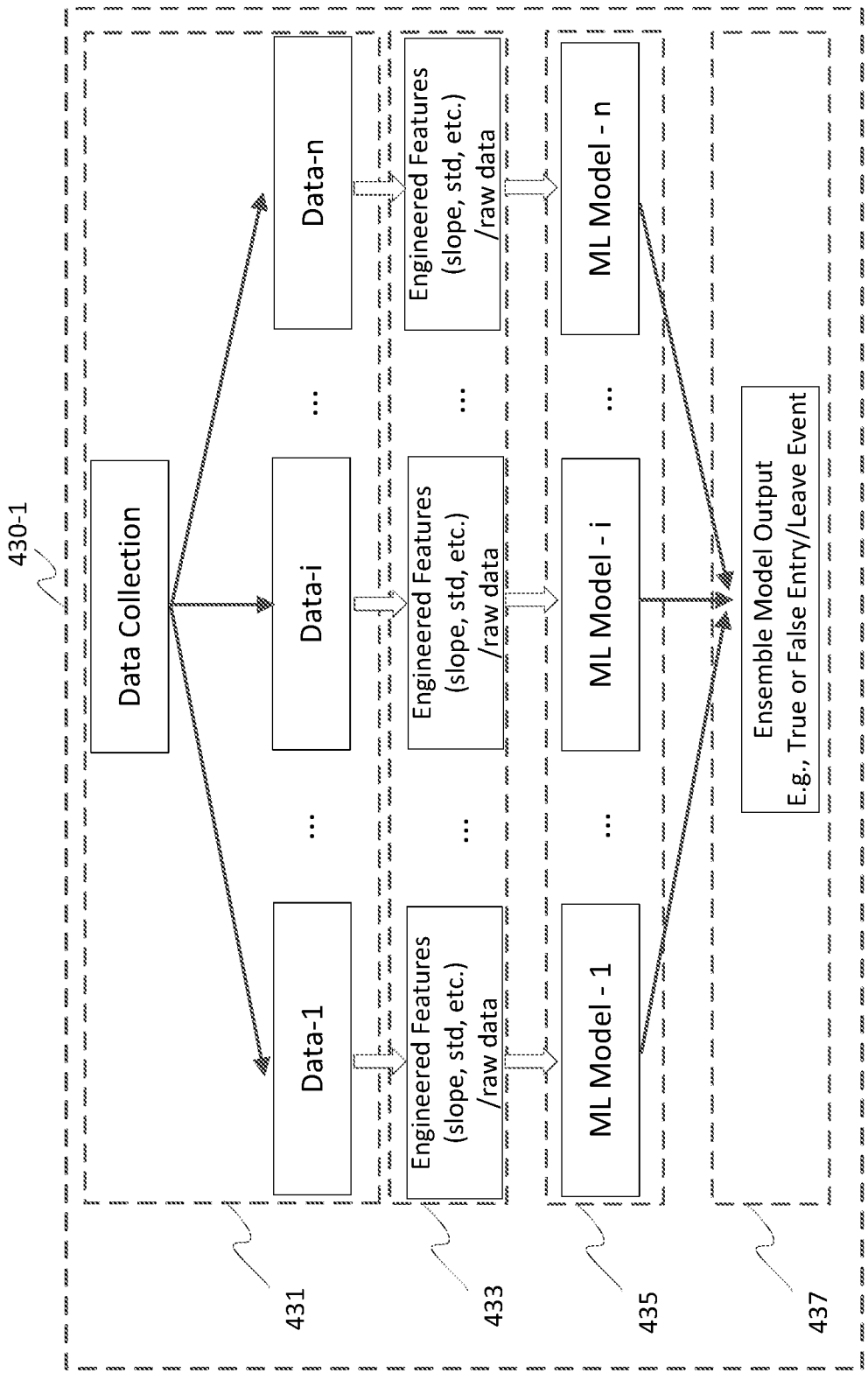

The machine learning system 430 may use one or more of any of various computational processes, for example, a linear logistic regression, a random forest regression, a neural network, a collection of models, a classifier model, a K-Nearest Neighbor regression, etc. Further, the machine learning system 430 may comprise different types of models. For example, as shown in FIG. 4B with machine learning model 430-1, a parallel processing multi-model approach may be used.

The machine learning model 430-1 may comprise a data collection section 431, an engineered features section 433, a model construction section 435, and a model output section 437. The data collection section 431 may collect the desired data from multiple sources labeled Data-1 through Data-i and ending at Data-n. Each of the sources, Data-1 through Data-n may be associated with specific types of data for any given wireless device. A source may comprise, for example, RSSI values for a particular wireless device. Also, or alternatively, a source may comprise Channel State Information (CSI). Also, or alternatively, a source may comprise packet loss information, etc. Further, the data collection section 431 may collect data for multiple wireless devices. The engineered features section 433 may be used to perform various calculations on the data collected in the data collection section 431. For example, the data collection section may capture RSSI values, for a particular wireless device, that may include intervals of increasing or decreasing values. The engineered features section 433 may determine rates of change during these intervals. The rates of change, or slopes, of the signal increasing or decreasing may be determined at various times to determine if there is an overall decreasing in signal strength that may indicate a leave event, or if there is an overall increasing in signal strength that may indicate an entry event. Other features may be determined to be significant, such as by applying standard deviations or other mathematical functions to the data collected in the data collection section 431.

In the model construction section 435, a machine learning model for each data source (e.g., Data-1 through Data-n) may be constructed that may be used to estimate a probability of each event of interest, for example an entry event or a leave event, based on each source. Such a design may also be referred to as a parallel machine learning design. One or more of the models of the section 435 may, for example, be pre-trained using labelled data samples. Those data samples may be associated with device(s) and/or a premises for which presence detection may be performed, and/or may be associated with other devices and/or premises. The model output section 437 may combine the output from each model, potentially in a weighted manner, to determine an ultimate prediction, for example, whether the data input may indicate a true entry or a true leave event in a sensing region.

Figure 4C:
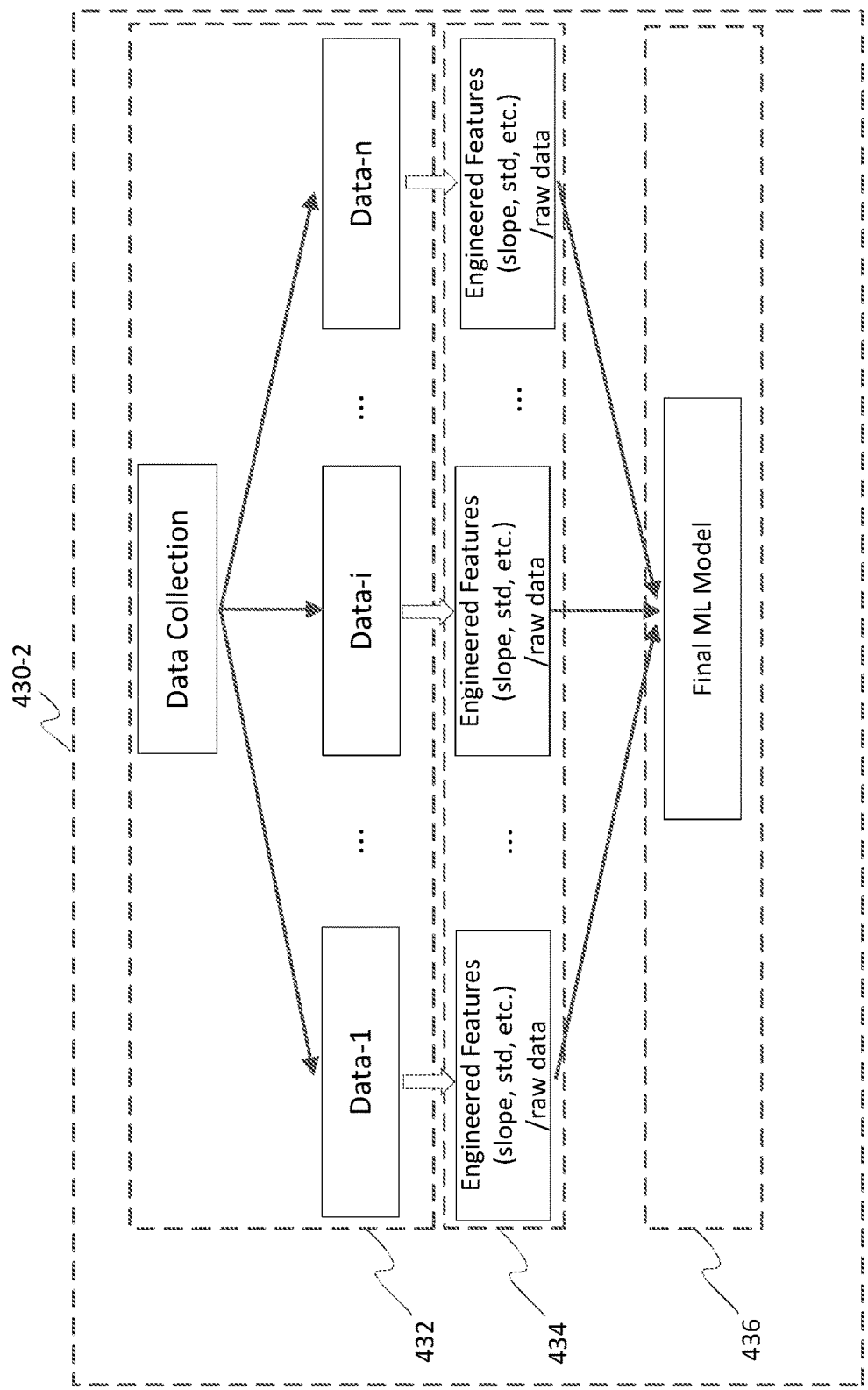

FIG. 4C shows a machine learning model 430-2, a single machine learning decision model that comprises a data collection section 432, an engineered features section 434, and a model output section 436. Similar to the parallel model of FIG. 4B, the data collection section may collect the desired data from multiple sources and/or may otherwise perform the functions similar to those performed by the data collection section 431 of FIG. 4B. The engineered features section 434 may, similar to the engineered features section 433 of FIG. 4B, perform various calculations that may be used in analyzing data collected by the data collection section 432. In contrast to the parallel machine learning design of the model construction section 435, the machine learning model 430-2 comprises the model output section 436 that comprises a single final machine learning model that accepts the outputs from all of the engineered features streams. The final machine learning model of the model output section 436 may determine the relationships between the various data sources and makes a final prediction of the event of interest.

Figure 6:
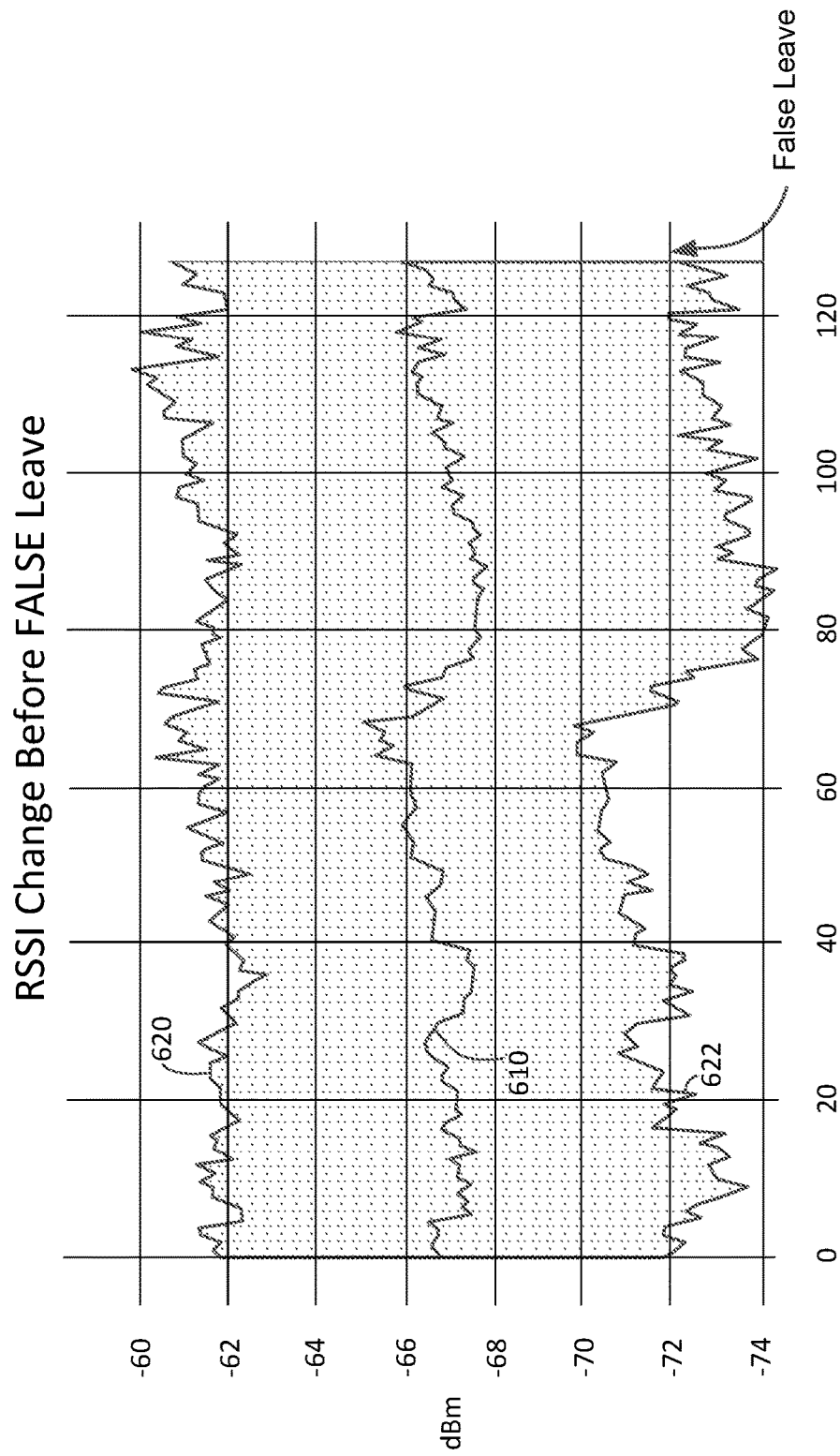
FIG. 6 shows an example of RSSI signal values over time during a false leave event.

FIG. 5A shows an example charting of RSSI values versus time indicative of a true leave event, from a sensing region, for a wireless device. The RSSI values may, for example, be those determined by the computing device 310 for signals received from the wireless device 335. FIG. 5A shows data that may be indicative of a true leave event (e.g., an event in which a wireless device actually leaves a sensing region). FIG. 6, described below, shows an example of data that may be indicative of a false leave event (e.g., an event in which the wireless device may have disconnected without leaving a sensing region). FIG. 5A shows the RSSI average value curve 510 located between an RSSI maximum value curve 520 and an RSSI minimum value curve 522. As a computing device may determine multiple varying RSSI values each second for a particular signal, as shown by the maximum and minimum value curves 520 and 522. Average RSSI values, for example as shown by the curve 510, may be used (e.g., to simplify calculation). RSSI values may fluctuate due to external factors such as absorption, interference, or diffractions. FIG. 5A shows an average RSSI value of approximately −64 dBm at 60 seconds, as well as respective maximum and minimum RSSI values of −68 dBm and −60 dBm.

At 0 seconds, the average RSSI value of approximately −61 dBm may indicate a presence of the wireless device 335 in the sensing region 320. At approximately 60 seconds, the average RSSI values start to gradually decrease over time. At approximately 98 seconds the average RSSI levels off at about −94 dBm. The decrease in average RSSI values may indicate an increase in distance between the wireless device 335 and the computing device 310, thus indicating a possible leave event. The low average RSSI levels beginning at approximately 98 seconds may indicate a disconnection of the wireless device 335 from a wireless network and/or from the computing device 310. The low average RSSI levels may be further monitored to determine if the average RSSI levels remain low, indicating a continued disconnection instead of a possible momentary movement out of range. If the average RSSI levels remain low for a predetermined amount of time, the disconnection of the wireless device 335 from a wireless network and/or from the computing device 310 may be confirmed.

Figure 5B:
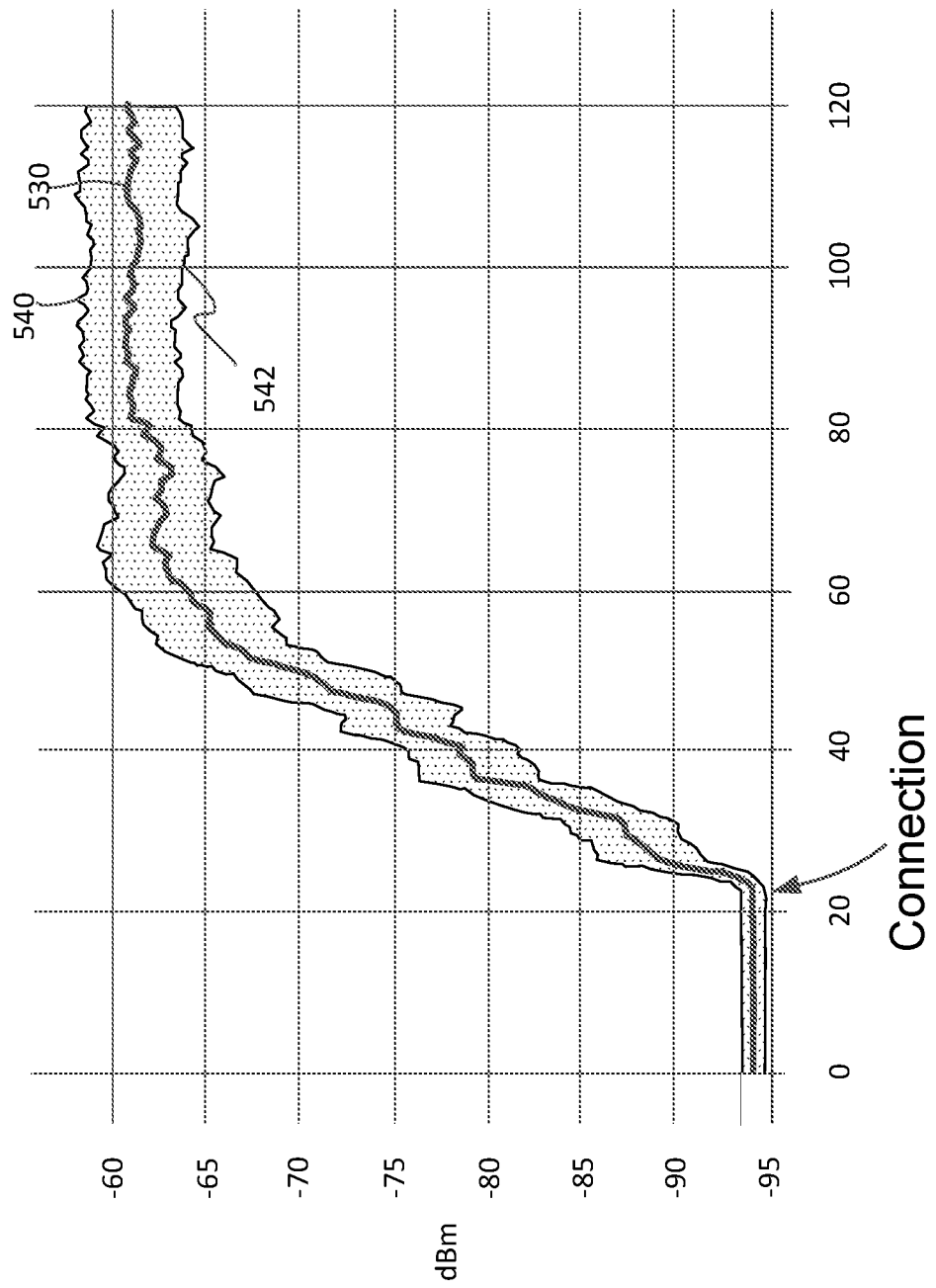

FIG. 5B shows an example charting of RSSI values versus time indicative of a true entry of a wireless device into a sensing region. The RSSI values may, for example, be those determined by the computing device 310 for signals received from the wireless device 335. FIG. 5B shows data that may be indicative of a true entry event (e.g., an event in which a wireless device actually enters a sensing region). FIG. 5B shows an average RSSI average value curve 530, a RSSI maximum value curve 540, and a minimum value curve 542. For example, at time 100 seconds, the average RSSI value is approximately −61 dBm with the actual values showing a minimum of −64 dBm and a maximum of −58 dBm.

At 0 seconds, the average RSSI value of approximately −94 dBm may indicate the lack of a presence of the wireless device 335 in the sensing region 320. At approximately 22 seconds, the average RSSI values start to gradually increase over time. At approximately 60 seconds, the average RSSI values start to level off, peaking and remaining relatively constant at approximately 80 seconds. The increase in average RSSI values may indicate a decrease in distance between the wireless device 335 and the computing device 310, thus indicating a possible entry event. The continuing strong average RSSI levels from 60 seconds may indicate a continued presence of the wireless device 335 in a sensing region. The high average RSSI levels may be further monitored to determine if the average RSSI levels remain high, indicating a presence of the wireless device 335 in the sensing region 320.

FIG. 6 shows an example charting of RSSI values versus time indicative of a false leave event for a wireless device and a sensing region. The RSSI values may, for example, be determined by the computing device 310 for signals received from the wireless device 335. FIG. 6 shows a curve 610 for average RSSI values, with the corresponding curves 620 and 622 for maximum and minimum RSSI values, respectively. FIG. 6 shows data that may be indicative of a false leave event (e.g., an event in which the wireless device may have disconnected without leaving the sensing region). For example, at approximately 125 seconds, the average RSSI signal value drops from −65 dBm to −74 dBm (or lower) in less than 1 second. The abrupt decrease in average RSSI signal value may indicate a sudden disconnection of the wireless device 335 from the computing device 310. A large decrease in RSSI value over a short amount of time may be indicative of a false leave event. As no gradual decrease in the RSSI value is shown, there may be no indication of wireless device 335 moving away from the computing device 310 while within sensing region 320. Rather, a sudden drop or disconnect may be an indication that a sudden change in status occurred. For example, the battery within the wireless device may have died, the wireless device entered a sleep or standby mode, or the wireless or other method of communication may have been disabled.

Figure 7A:
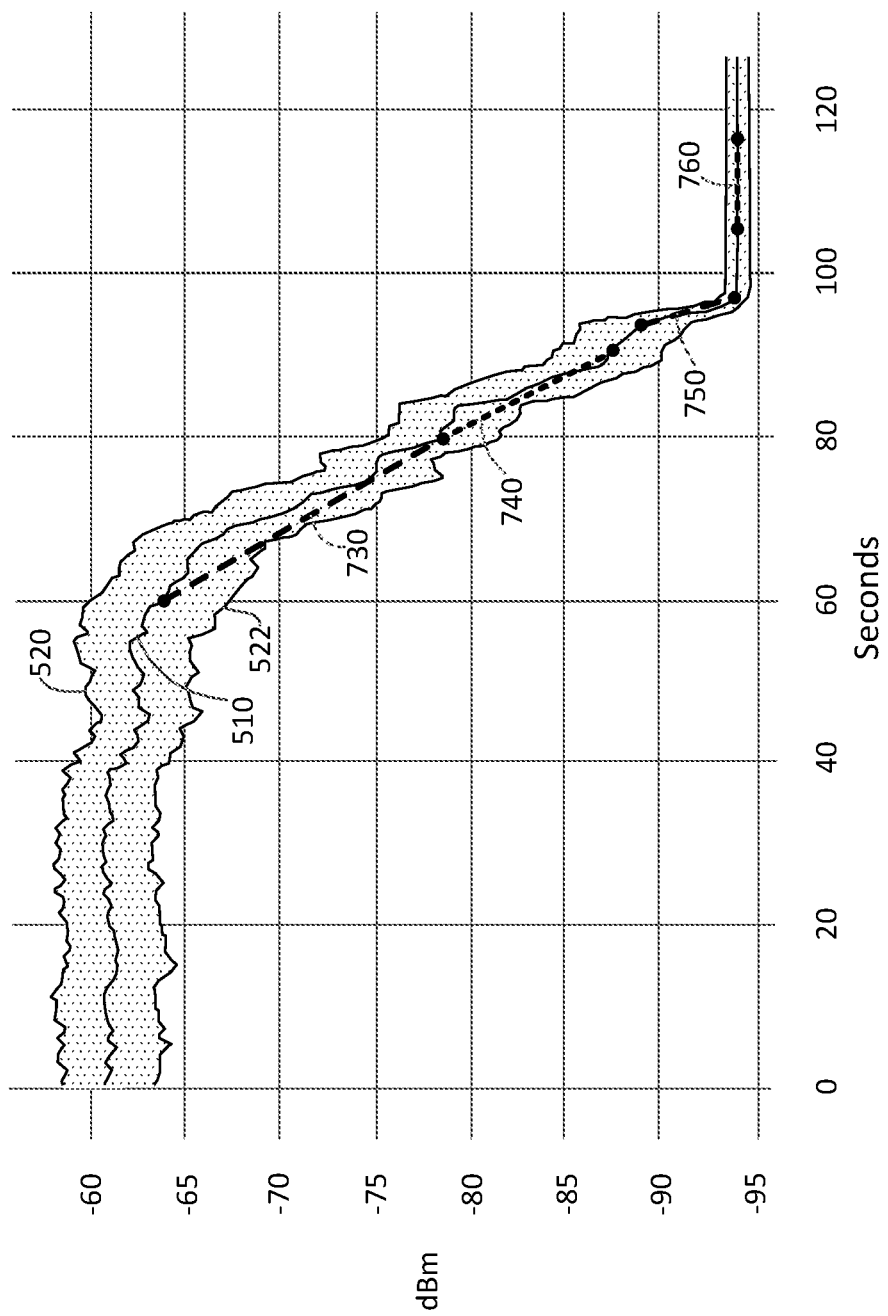
FIG. 7A shows, using curves from FIG. 5A, example slopes associated with rates of change before a true leave event.

FIG. 7A shows the same example charting of RSSI values versus time from FIG. 5A. To determine whether a true entry/leave event has occurred, RSSI and/or other signal parameters may be analyzed over time. This may be done to distinguish a true entry/leave event, which may be associated with a gradual increase or decrease in RSSI (and/or other values) such as is shown in FIGS. 5A and 5B, from a false entry/leave event, which may be associated with an abrupt change in RSSI (and/or other values) such as shown in FIG. 6. For example, RSSI value information may be analyzed over a particular time period, for example for 128 seconds. Other data may also be collected over time for use in determining if a true entry/leave event has occurred. Such data may comprise channel state information, frequency or frequencies being used, and the type of connection, for example, wireless or cellular. Once data is collected, it may be analyzed at different intervals, for example during the most recent 5, 10, 30, 40 and 60 seconds.

FIG. 7A shows features that may be determined by analyzing data, for example, average RSSI values, over different time intervals. For example, a slope 730 is shown to cover a 20 second window. The slopes 740 and 760 cover a 10 second window and the slope 750 covers a 5 second window. One approach to determining a true entry/leave event is by analysis of one or more rates of change of RSSI values. The calculation of a slope of RSSI values is an example of a calculated or engineered feature. Other calculated or engineered features may comprise, for example, a standard deviation of average RSSI values over one or more intervals to determine a distribution or variability of the RSSI values.

A slope of RSSI values vs. time may indicate a rate of change in the RSSI values, which may in turn indicate a speed, or velocity, and/or distance between the wireless device 335 and the computing device 310. An increase in RSSI values (e.g., a positive slope for a plot using the convention of FIGS. 5A, 5B, 7A and 7B) may indicate the distance between the wireless device 335 and the computing device 310 is decreasing. Conversely, a decrease in RSSI values (e.g., a negative slope for a plot using the convention of FIGS. 5A, 5B, 7A and 7B) may indicate that the distance between the wireless device 335 and the computing device 310 is increasing. A rate of change (e.g., a slope of the graphs of FIGS. 5A, 5B, 7A and 7B) may comprise a ratio of a change in RSSI values over a particular time period associated with the change in values. A steeper (e.g., higher absolute value) slope may indicate a greater rate of change and/or a higher speed of movement of the wireless device 335 toward or away from the computing device 310. The sign of the rate of change (e.g., a positive or negative slope) may also be indicative of a direction of movement (e.g., a positive slope may be indicative of the wireless device 335 moving closer to the computing device 310, and a negative slope may be indicative of the wireless device 335 moving away from the computing device 310). For example, the slope 730 shows a change in signal strength (e.g., average RSSI values) over a 20 second period, starting at 60 seconds and ending at 80 seconds. The RSSI value starts at approximately −64 dBm and decreases to −77 dBm, a decrease of −13 dBm. The slope 730 has a value of is −13/20, or approximately −0.65 dBm/sec. The slope 740 may be calculated as a decrease in average RSSI values from approximately −77 dBm to −87 dBm, a decrease of 10 dBm over the 10 seconds between 80 seconds to 90 seconds. The slope 740 has a value of −10/10, or approximately −1 dBm/sec. The slope 750 may be calculated as a decrease in average RSSI values from approximately −88 dBm to −94 dBm, a decrease of 6 over the 5 seconds between 93 seconds to 98 seconds for a value of −6/5, or approximately −1.2 dBm/sec.

The slopes 730, 740 and 750 are negative, indicating a decrease in signal strength. The −0.65 dBm/sec slope of slope 730 may indicate a slower pace of the wireless device moving away from the computing device than the −1.2 dBm/sec slope of slope 750. FIG. 7A further shows the signal strength plateauing at approximately 98 seconds yielding a slope value of 0 for slope 760. If the slope 760 corresponds to a predetermined time period, and/or if the average signal strength remains below a predetermined value for a predetermined time period, a computing device may determine that there has been no re-entry of the wireless device into the sensing region, and the leave event may be confirmed.

Figure 7B:
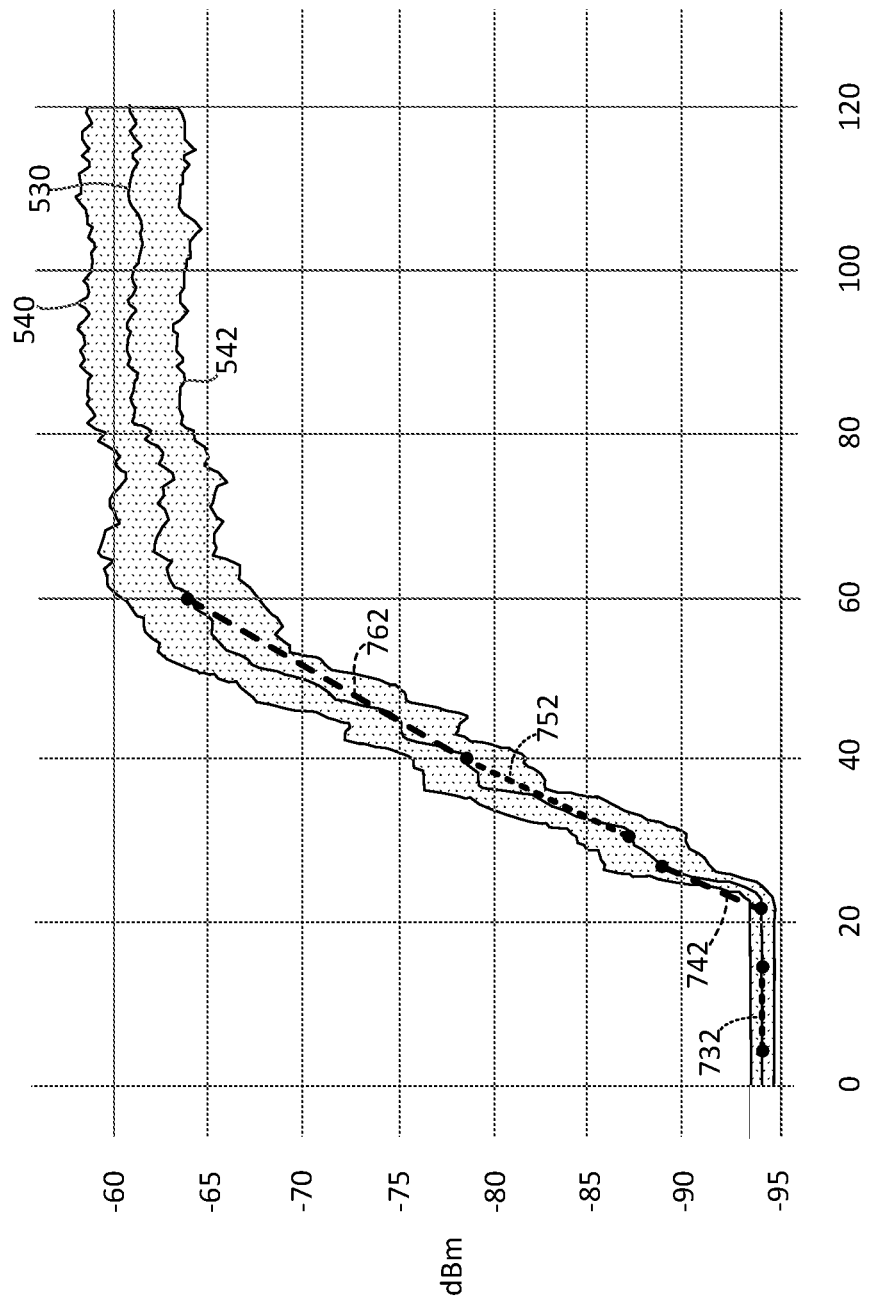
FIG. 7B shows, using curves from FIG. 5B, example slopes associated with rates of change after a true enter event.

FIG. 7B shows the same example charting of RSSI values versus time from FIG. 5B. At 0 seconds in FIG. 7B, an average RSSI average value of approximately −94 dBm may indicate a lack of a presence of the wireless device 335 in the sensing region 320. The value of slope 732 shows no change is RSSI value. A slope of zero (or other predetermined value) over a predetermined time period, and/or an average RSSI value below a predetermined value over a predetermined time period, may be indicative that the lack of presence of the wireless device 335 continues. A signal may be first detected at approximately 22 seconds. The signal strength may increase from the 22 second mark until approximately 63 seconds. A gradual increase in signal strength over that time period may be determined based on slopes calculated at one or more predefined intervals, which may be at specific time marks, for example, every 5 seconds, or at specific times, for example, at 60 seconds, at 120 seconds, etc. As an example, FIG. 7B shows an increase of the signal strength corresponding to the slopes 742, 752 and 762. These slopes are positive, as the signal values are increasing. For example, the slope 742 may have a value of +1.4 dBm/sec that corresponds to an increase in average RSSI value from −94 to −87 dBm over 5 seconds. The slope 752 may have a value of +0.9 dBm/sec that corresponds to an increase in average RSSI value from −87 to −78 dBm over 10 seconds. The slope 762 may have a value of +0.4 dBm/sec that corresponds to an increase in average RSSI value from −78 to −64 dBm over 20 seconds. The slope 742 may indicate a faster rate of change as compared to the slope 752, and the slope 752 may indicate a faster rate of change as compared to the slope 762.

As shown in the examples of FIGS. 7A and 7B, multiple slopes may be used to characterize a non-linear increase or decrease of values for a communication parameter over one or more time periods. For example, values for a communication parameter may, during a time period associated with an entry/leave event, gradually change according to a pattern. That pattern may correspond to a curve that is exponential or otherwise non-linear. However, different parts of that curve associated with different time intervals may be approximated by different slopes. A communication parameter pattern associated with the curve may be indicated by a set of slopes (e.g., values for rate of change), with each of those slopes corresponding to a different portion of the time period associated with the entry/leave event. For example, the pattern of the average RSSI values shown in FIG. 7A may be indicated as a first slope of −0.65 dBm/sec for a 20 second time duration (slope 730), a second slope of −1 dBm/sec for an immediately-following 10 second time duration (slope 740), a third slope for an immediately-following 3 second time duration (between slopes 740 and 750), and a fourth slope of −1.2 dBm/sec for an immediately-following 5 second time duration.

In addition (or as an alternative) to analyzing signal strength values to determine a true entry/leave event, additional communication parameters may be used to determine, or assist in the determination of, a true entry/leave event. For example, the use of CSI may comprise information on how a signal propagates and the effect of scattering, fading, and power decay. Wireless devices may have the ability to use different frequency bands, and may be able to switch from one band to another based on signal strength, bandwidth requirements, etc. For example, the 802.11 wireless standard provides for the use of communications in the 900 MHZ. 2.4 GHZ, 3.6 GHZ, 4.9 GHZ, 5 GHz, 5.9 GHZ, and 60 GHz bands.

However, different frequencies exhibit different transmission characteristics. For example, there are differences in the range, or coverage, and/or bandwidth associated with use of the 2.4 GHz and 5 GHz frequency bands. The 2.4 GHz band may provide more range and/or a larger coverage area than the 5 GHz band, but may do so at lower bandwidth. The 5 GHz band may provide less range and/or a smaller coverage area than the 2.4 GHz band, but may allow greater bandwidth. For example, a signal in the 5 GHz band may have greater bandwidth, but less ability to pass through solid objects, than a signal in the 2.4 GHz band.

If a user of a wireless device (e.g., the wireless device 335) able to operate on both the 2.4 GHz band and the 5 GHz band is approaching a sensing region, that wireless device may be able to communicate with a computing device (e.g., the computing device 310) on the 2.4 GHz band before it is able to communicate with the computing device on the 5 GHz band. As the wireless device moves closer to the computing device, communications that were initially established via the 2.4 GHz band may be changed to (and/or discontinued in favor of) communications via the 5 GHz band. Thus, band switching may also be used to determine movement characteristics of a wireless device. A switch from the 2.4 GHz band to the 5 GHz band may be indicative of the wireless device moving closer to the computing device. Conversely, the wireless devices switching from the 5 GHz band to the 2.4 GHz band may be indicative of the wireless device moving away from the computing device.

Also or alternatively, directional sensing may be used to determined presence of a wireless device in a sensing region. Directional sensing may comprise beam forming using a phased antenna array to produce signals in specific directions. Information about those directions may be used to track a wireless device within a sensing region. Other technologies such as additional node extenders with spot beam forming, may be used to track and locate a wireless device within a sensing region. Using machine learning, one or more different factors, such as beam forming, RSSI, CSI, etc., may be evaluated to determine which factors are more important to determine the presence of a wireless device and those factors may be weighted accordingly. Also, or alternatively, a sensing region, such as the sensing region 320 need not be confined to a single home-based wireless area. Rather, the sensing region 320 may be a combination of a home-based wireless gateway that comprises a 5G base station capable of covering a much larger area. Also, or alternatively, the computing device 310 in the sensing region 320 may share location and presence information with other sensing regions, and/or may overlap with other sensing regions. The computing device 310 in the sensing region 320 may be integrated with cellular coverage with the ability to switch, or hand-off between wireless and cellular, or satellite, or other wireless systems.

Figure 8:
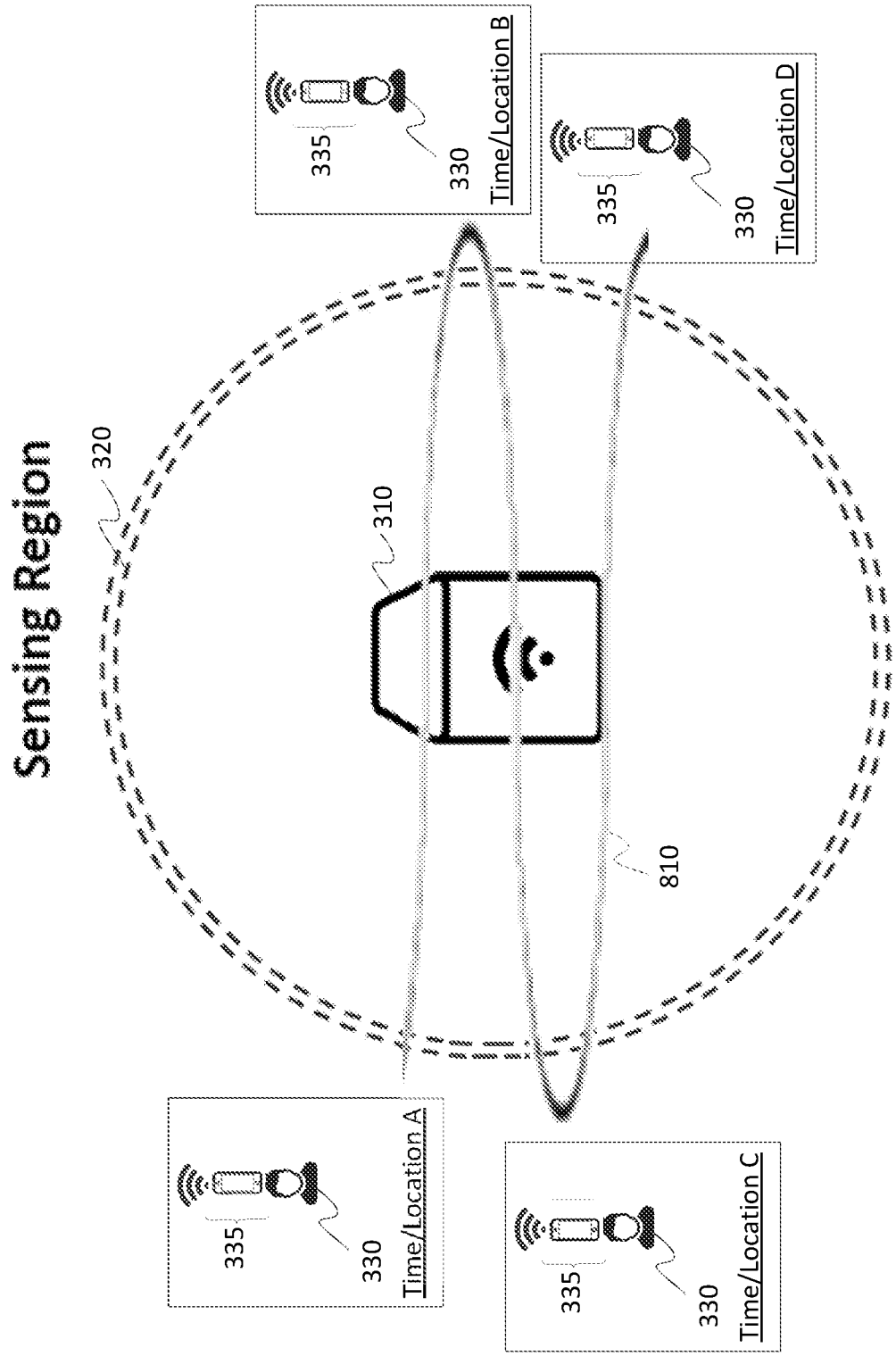
FIG. 8 shows an example of multiple border events.

FIG. 8 shows the sensing region 320, the computing device 310, and the user 330 with the wireless device 335 of FIG. 3. However, FIG. 8 also shows that the user 330 with the wireless devices 335 traverses a path 810. The path 810 enters and leaves the sensing region 320 multiple times, resulting in connections and disconnections with the computing device 310. For example, the user 330 with the wireless device 335 may enter the sensing region 320 at time/location A, may exit the sensing region 320 at time/location B and immediately re-enter the sensing region 320, may exit and enter the sensing region 320 at time/location C, and may ultimately leave the sensing region 320 at time/location D.

A true entry followed by a true leave within a certain time period, or a true leave followed by a true entry within a certain time period, for example at time/locations B and C, may also be treated as a border event. However, time/location D represents a true leave, without reentering the sensing region 320.

Border events may not indicate that a user is really entering or leaving a sensing region. For example, a border event may correspond to a child that is playing in a yard that is on the periphery of the sensing region 320. As another example, a user may be following a movement pattern in connection with an activity (e.g., cutting the grass) that repeatedly takes the user in and out of a sensing region over short time periods. To distinguish a border event from a true entry or a true leave event, an amount of time may be determined to differentiate between a border event and a single entry/leave event. For example, a 30-60 second period may be used (e.g., an entry/leave event followed by a second entry/leave event within the 30-60 second time period may be classified as a border event). A border event may be determined to not trigger an action, such as a notification.

Figures 9A, 9B:
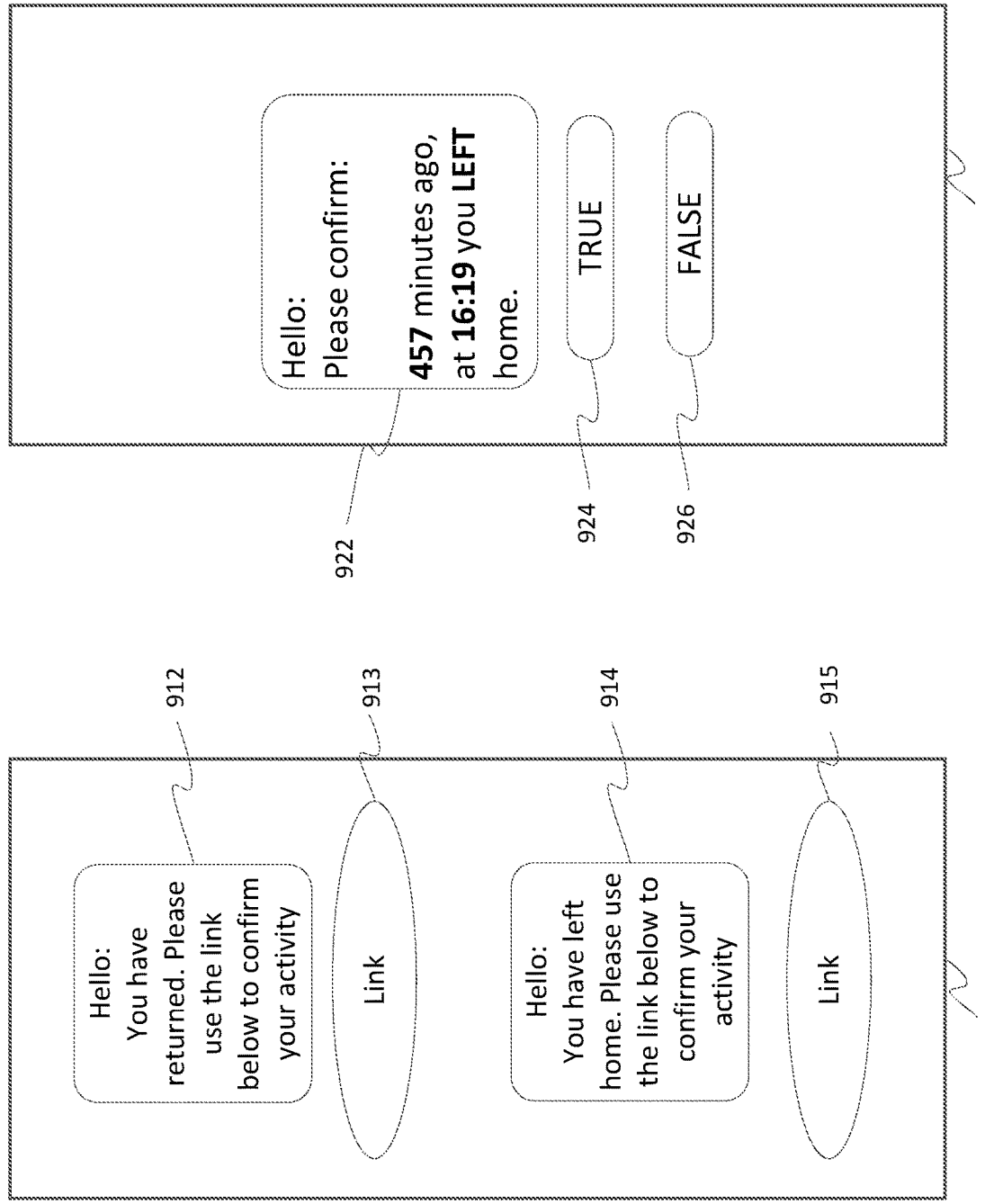
FIGS. 9A and 9B show example notification and confirmation requests.

FIGS. 9A and 9B shows example notifications that may displayed in connection with a wireless device entering or leaving a sensing region and/or in connection with presence detection herein. The example notifications may be sent to and/or displayed by any computing device. For example, one or more notifications may be sent to a computing device associated with an owner of a premises (e.g., a premises associated with the sensing region 320) associated with a wireless network. That computing device may be different from the wireless device determined to be entering or leaving that premises. Also or alternatively, one or more notifications may be sent to the wireless device that is entering or leaving the premises Notifications may take the form of a text message, email, chat, and/or any other type of communication. FIG. 9A shows example notifications, presented on a display 910, that comprises two messages (e.g., successive text messages). A message 912 indicates that a true entry event has been detected. In addition, to train and verify system performing presence detection, for example, a system using a machine learning model of FIG. 4A, 4B or 4C, the message 912 may include a link 913 that the user may select to verify that the entry event is correct. The message 914 may indicate that a true leave event has been detected. The message 914 may include a link 915 that the user may select to verify that the leave event is correct. In addition to a link, such confirmation may occur through the use of a chat, message, email, or through a social media service.

FIG. 9B shows an example notification, presented on a display 920, that informs a user of an entry/leave event. In the example of FIG. 9B, the notification may comprise message area 922 indicating a time and a description of the event, a "True" confirmation selection 924, and a "False" confirmation selection 926. Also or alternatively, notifications may comprise notifications to others, such as notifying a user, parent, teacher, etc. of an entry/leave event, or a status. Notifications may take the form of SMS messaging and may be generated by a computing device (e.g., the computing device 310) in a sensing area associated with presence detection indicated by the generated notification, and/or may be generated elsewhere (e.g., via a cloud service). Also or alternatively, a computing device in a sensing area (e.g., the computing device 310) may detect an entry/leave event, upload the detection to a cloud service, and/or report the entry/leave event to a user via SMS, email, a social media service, and/or other method. Notifications may, for example, be used to alert parents or caregivers if a child leaves school, approaches home, and/or enters a home sensing region.

Notifications may also be dependent on factors such as the detection of a border event. As shown in FIG. 8, a border event may occur if there are multiple entry/leave events during a predefined time period. If an occurrence of a border event is determined, notifications of entry/leave events associated with the border event may be suppressed.

As described above, signal strength is a communication parameter, for wireless communications associated with a wireless device (e.g., the wireless device 335), that may be used for presence determination (e.g., to determine entry/leave events such as an arrival of the wireless device at a premises or a departure of the wireless device from the premises). Values of signal strength may comprise, for example, RSSI values. However, one or more other communication parameters may also or alternatively be used for presence determination. One or more communication parameters used for presence determination may be associated with wireless communications received from a wireless device for which for presence determination is being performed. Also or alternatively, one or more communication parameters used for presence determination may be associated with wireless communications transmitted to a wireless device for which presence determination is being performed.

Coding type is a communication parameter that may also or alternatively be used in connection with presence determination. As distance between a wireless device and an access point increases, more robust coding schemes may be used to reduce errors. As distance between a wireless device and an access point decreases, less robust coding schemes may be used to increase bandwidth and/or data throughput.

A change in coding type may be used as an indicator of whether a wireless device is moving toward or away from an access point. Coding type may, for example comprise use or non-use of error correction, type of error correction, orthogonal frequency division multiplexing (OFDM) parameters (e.g., number of spatial streams, code rate), and/or other types of coding. Values of a coding type communication parameter may comprise indices assigned (e.g., according to communication protocol and/or standard) to coding types and/or schemes, and/or other indicators of coding used.

Modulation type is a communication parameter that may also or alternatively be used in connection with presence determination. As distance between a wireless device and an access point increases, more robust modulation schemes (e.g., BPSK, QPSK, etc.) may be used to reduce errors. As distance between a wireless device and an access point decreases, less robust modulation schemes (e.g., 64-QAM, 256-QAM, etc.) may be used to increase bandwidth and/or data throughput. A change in modulation type may be used as an indicator of whether a wireless device is moving toward or away from an access point. Values of a modulation type communication parameter may comprise indices assigned (e.g., according to communication protocol and/or standard) to modulation types and/or schemes, and/or other indicators of coding used. A communication parameter may be associated with both modulation type and coding type and comprise values that comprise indices assigned (e.g., according to communication protocol and/or standard) to a modulation and coding scheme (MCS).

Packet loss is a communication parameter that may also or alternatively be used in connection with presence determination. As distance between a wireless device and an access point increases, packet loss may increase. As distance between a wireless device and an access point decreases, packet loss may decrease. A change in value for packet loss (e.g., quantity of packets lost) may be used as an indicator of whether a wireless device is moving toward or away from an access point.

As previously described, radio frequency (RF) band used for wireless communication is a communication parameter that may also or alternatively be used in connection with presence determination. As distance between a wireless device and an access point increases, communications may be transferred from a band having greater bandwidth but shorter range (e.g., 5 GHz) to a band having less bandwidth but greater range (e.g., 2.4 GHz). As distance between a wireless device and an access point decreases, communications may be transferred from a band having less bandwidth but greater range (e.g., 2.4 GHz) to a band having more bandwidth but less range (e.g., 5 GHZ). Values of an RF band communication parameter may comprise indices assigned (e.g., according to communication protocol and/or standard) to RF bands, and/or other indicators of RF band.

As previously described, CSI is a communication parameter that may also or alternatively be used in connection with presence determination. CSI may indicate the effects of phenomena (e.g., scattering, fading, power decay) that become more severe as distance between a wireless device and an access point increases.

Quantity of retransmissions is a communication parameter that may also or alternatively be used in connection with presence determination. As distance between a wireless device and an access point increases, a quantity of retransmissions may increase. As distance between a wireless device and an access point decreases, a quantity of retransmissions may decrease. A change in value for a quantity of retransmissions (e.g., quantity of retransmission attempts) may be used as an indicator of whether a wireless device is moving toward or away from an access point.

One or more of bandwidth, quantity of packets transmitted, quantity of bytes transmitted, quantity of packets received, quantity of bytes received, or physical layer (PHY) rate are communication parameters that may also or alternatively be used in connection with presence determination. As distance between a wireless device and an access point increases, values for these parameters may decrease. As distance between a wireless device and an access point decreases, values for these parameters may increase. Changes in values for these parameters may be used as indicators of whether a wireless device is moving toward or away from an access point.

One or more of error rate or signal-to-noise ratio are communication parameters that may also or alternatively be used in connection with presence determination. As distance between a wireless device and an access point increases, values for these parameters may increase. As distance between a wireless device and an access point decreases, values for these parameters may decrease. Changes in values for these parameters may be used as indicators of whether a wireless device is moving toward or away from an access point.

A device via which a wireless device is communicating is a communication parameter that may also or alternatively be used in connection with presence determination. For example, a wireless network in a premises may comprise a mesh network with multiple access points, range extenders, and/or other devices with which a wireless device may establish a wireless connection. As a wireless device moves to different locations throughout such a network, the wireless device may connect to different network devices (e.g., to a device closest to the position of the wireless device). Values for this communication parameter (e.g., an identifier of the access point, range extender, or other device to which the wireless device is connected) may be used as indicators an approximate locations of the wireless device.

Direction is a communication parameter that may also or alternatively be used in connection with presence determination. For example, an access point may comprise a directional antenna and/or may otherwise be configured to output values (e.g., azimuth and elevation) indicating a direction of a wireless network relative to the access point. Values for this communication parameter may be used as indicators of approximate locations of the wireless device.

Criteria, based on one more communication parameters, may be determined for use in connection presence determination. These criteria may be compared to values for communications parameters (and/or to rates of change and/or other engineered features based on those values) to determine presence. For example, and as described above in connections with FIGS. 5A-7B, rates of change of signal strength may be indicative of whether a wireless device is moving away from or toward an access point. Based on whether one or more rates of change and corresponding time durations for those rates of change, of signal strength values associated with wireless communications of the wireless device, are sufficiently similar to rates of change and corresponding time durations comprised by the criteria, a computing device may determine if the wireless device has entered or left a sensing region (e.g., a region associated with an access point and/or a premises). Similarity of an evaluated rate of change (e.g., a rate of change based on values from a wireless device) to a criterion rate of change may be determined based on, for example, whether the evaluated rate of change and the criterion rate of change are calculated over the same time duration (e.g., whether a time period associated with the evaluated rate of change satisfies a threshold associated with the criterion rate of change), whether the sign of the evaluated rate of change and the criterion rate of change are the same, and/or whether the evaluated rate of change has a magnitude (e.g., in dBm/sec) that is within a predetermined tolerance of the criterion rate of change (e.g., whether a magnitude of the evaluated rate of change satisfies one or more thresholds associated with a magnitude of the criterion rate of change). Also, or alternatively, rates of change and corresponding time durations for other communication parameters may be compared to criteria for those parameters that comprise rates of change and corresponding time durations. A presence determination may be based on comparison of multiple evaluated rates of change to multiple criteria rates of change, and a presence determination based on whether each of the multiple evaluated rates of change is sufficiently similar to a different criterion rate of change.

Because of differences in equipment, in physical arrangement of network components, in structures (e.g., homes) in which access points may be located, in size and/or other configurations of premises, in habits of individual users, and/or in numerous other characteristics, criteria for presence determination may be specific to a particular network, location, and/or group of users. For a single case (e.g., for a single network in a single premises with a defined group of users), criteria may be determined by review of data (e.g., plots similar to those of FIGS. 5A-7B) and selection of criteria based on that review. For large numbers of networks (e.g., associated with difference premises and/or users), machine learning (e.g., as described in connection with FIGS. 4A-4C) may be used to more efficiently determine criteria.

Figure 10A:
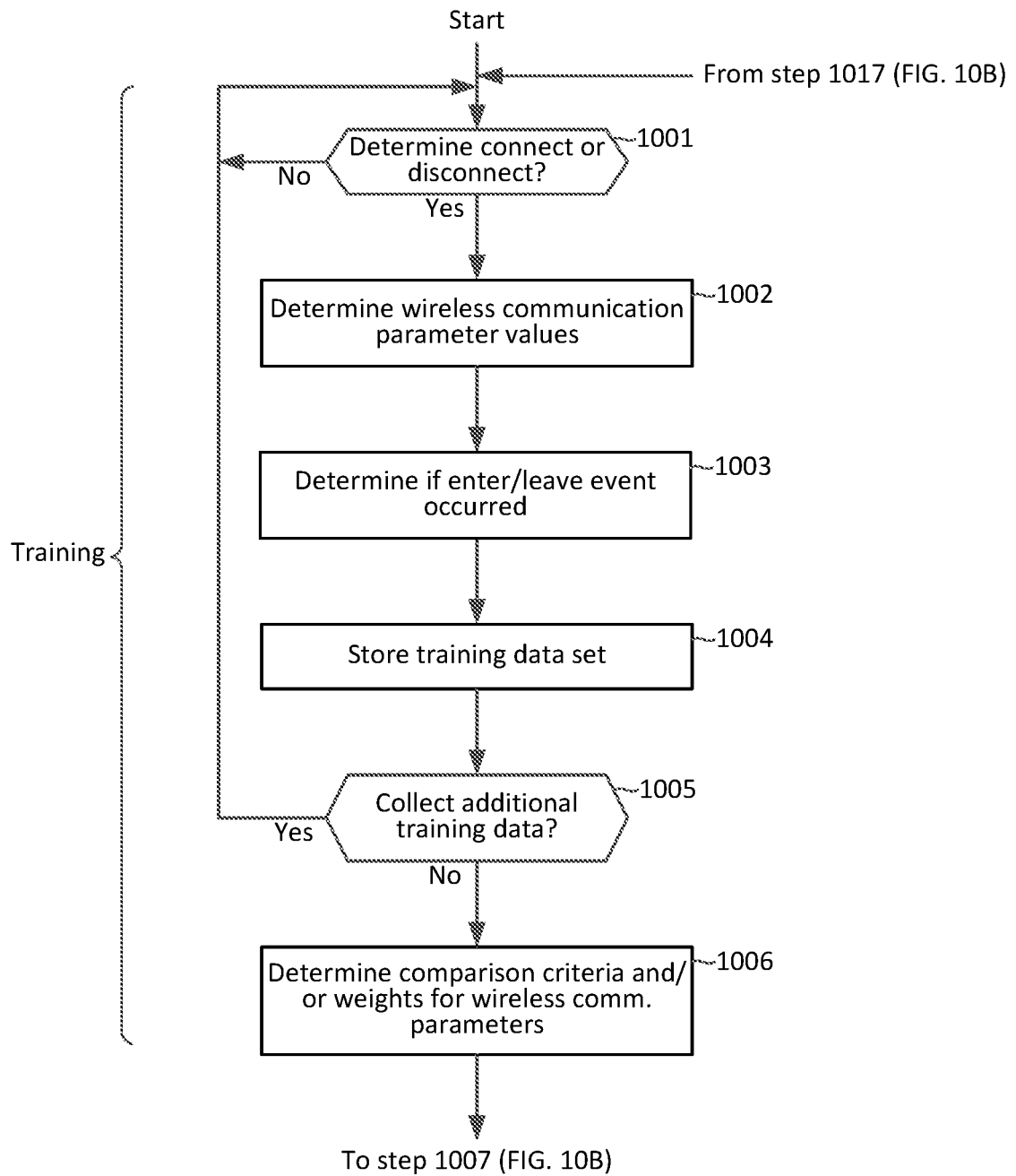
FIGS. 10A and 10B are a flow chart showing an example method for training one or more computer devices to perform presence detection, and for performing presence detection based on that training.
Figure 10B:
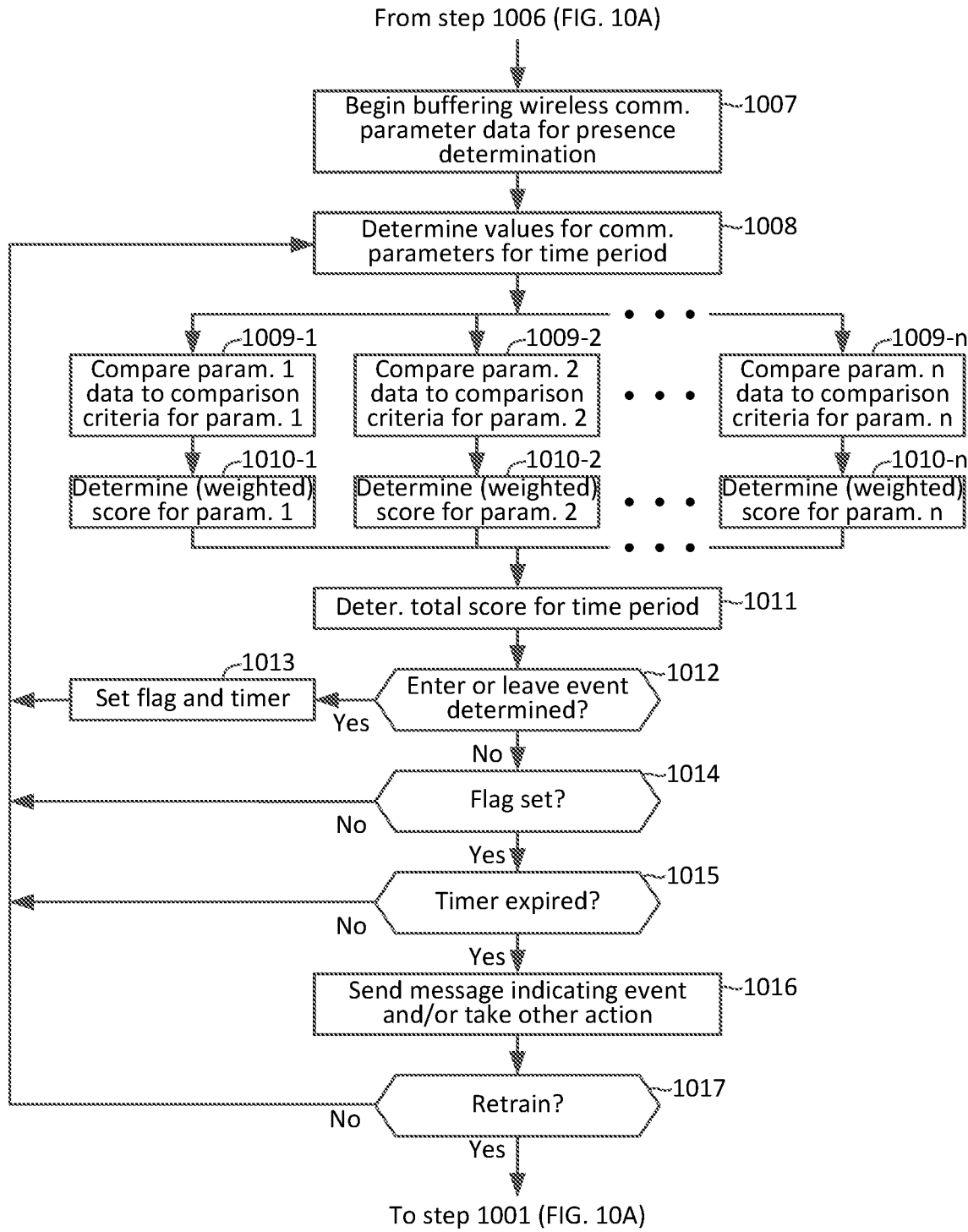

FIGS. 10A-10B are a flow chart showing an example method for training one or more computer devices to perform presence detection, and for performing presence detection based on that training. Steps of the method may be performed by a single computing device (e.g., the computing device 310) or may be distributed and performed by multiple computing devices. For example, some steps may be performed by one or more computing devices (e.g., the computing device 310) located at a premises, with other steps performed by one or more computing devices (e.g., presence determination server 122) located remotely from that premises. One, some, or all of the steps may be rearranged and/or otherwise modified. Steps may be omitted and/or other steps added.

In steps 1001-1006, training may be performed and criteria determined for use in presence detection. In step 1001, a computing device may determine a connection or a disconnection of a wireless device (e.g., the wireless device 335) to an access point (e.g., an access point comprised by the computing device 310). A connection may comprise, for example, exchange of communications between the access point and the wireless device that facilitate verification/authentication by the access point of the wireless device and/or that configure the access point and the wireless device for exchange of data. A disconnection may comprise the access point deleting the wireless device from a group of devices authorized to communicate via the access point. A disconnection may occur, for example, if the access point does not receive a communication from the wireless device within a time-out period. If no connect or disconnect is determined, step 1001 may be repeated. If a connect or disconnect is determined, step 1002 may be performed.

In step 1002, values may be determined for one or more communication parameters, associated with wireless communications of the connected or disconnected wireless device, for a pre-disconnect time period preceding (e.g., immediately preceding) the determined disconnection or for a post-connect time period following (e.g., immediately following) the determined connection. The pre-disconnect time period and the post-connect time period may be the same or different. Examples of durations for a pre-disconnect time period and/or for a post-connect time period comprise 10 seconds, 20 seconds, 30 seconds, 60 seconds, 90 seconds, 120 seconds, etc. The values of the communication parameters may be determined by retrieving those values from a buffer. For example, the access point may be configured to maintain a circular buffer to continuously store values for communications parameters for predetermined timed period (e.g., 2 minutes, 5 minutes, etc.).

In step 1003, whether the connection or disconnection corresponds to a verified enter/leave event may be determined. Step 1003 may comprise, for example, sending a message to a device (e.g., the connecting or disconnecting wireless device, or another device) asking if the wireless device as entered or left a premises, and receiving a response indicating whether an enter/leave event occurred.

In step 1004, a training data set for the current loop through steps 1001-1003 may be stored. The stored training data set may comprise values received in step 1002, an indication of the determination in step 1003, and other data associated with the determination of step 1001. That other data may comprise an indication of whether a connection or disconnection was determined, the time and/or date of the connection or disconnection, and/or an identifier for the wireless device that connected or disconnected.

In step 1005, a determination may be made of whether additional training data should be collected. Step 1005 may comprise, for example, determining if sufficient training data sets have been stored and/or whether a minimum training period (e.g., 2 days, 1 week, 1 month, etc.) has passed since the method commenced. If additional training data should be collected, step 1001 may be repeated. If additional training data is not needed, step 1006 may be performed.

In step 1006, presence detection criteria may be determined for some or all of the communication parameters for which data was collected in connection with performances of steps 1002. For some communication parameters (e.g., signal strength), the criteria may comprise one or more rates of change (and, optionally, corresponding time durations) for comparison against rates of change to be evaluated for presence detection. For some communication parameters (e.g., RF band), the criteria may indicate a sequence of values (e.g., change from 5 GHz to 2.4 GHz as a criterion for a leave event, change from 2.4 GHz to 5 GHz as a criterion for an enter event). As part of step 1006, weights may also be determined for one or more of the determined criteria. For example, satisfaction of criteria based on signal strength may be weighted higher than criteria based on one or more other communication parameters. Step 1006 may be performed using machine learning according to one or more of the machine learning methods described in connection with FIGS. 4A-4C. For example, each of the training data sets may be used to create separate data inputs for Data-1 through Data-n shown in FIGS. 4B and 4C. For example, a training data set may comprise, for each of n communication parameters, values over a pre-disconnect or post-connect period. Values for a first communication parameter over the pre-disconnect or post-connect period, together with an indication of whether an enter/leave event occurred, may be comprised by Data-1, values for a second communication parameter over the pre-disconnect or post-connect period, together with an indication of whether an enter/leave event occurred, may be comprised by Data-2, etc.

In addition to steps 1001 through 1006, and/or as an alternative, one or more models may be pre-trained and/or trained using labelled data samples. Those data samples may be associated with device(s) and/or a premises for which presence detection may be performed, and/or may be associated with other devices and/or premises.

After step 1006 and/or other pre-training and/or training, the method may transition to presence determination based on the training of steps 1001-1006. In step 1007 (FIG. 10B), buffering of values for communication parameters may begin. The buffering may comprise buffering of such values in a circular buffer similar to that described in connection with step 1002. In step 1007, the size of the circular buffer may be adjusted relative to the size of the buffer used in connection with training.

As described below in connection with steps 1008-1017, a computing device may repetitively retrieve data from the buffer and perform a presence determination based on that retrieved data. To determine whether there has been an enter/leave event (e.g., whether there has been an arrival of a wireless device at a premises or a departure of a wireless device from a premises), a computing device may retrieve a portion of the data from the buffer and evaluate that data based on the presence detection criteria determined in step 1006. The retrieved portion may correspond to a certain time period (e.g., 30 seconds, 60 seconds, 90 seconds, 120 seconds, etc.). For example, if the retrieved portion of the data comprises values for signal strength at each of multiple 1 second intervals during a 90 second time period, the computing device may determine one or more rates of change (and optionally, corresponding durations for those rates of change) for signal strength during the 90 second time period, and may compare those one or more determined rates of change to criteria rates change. Also or alternatively, values for one or more other communication parameters during the time period (and/or engineered features based on those values) may be compared to criteria for those other communication parameters. Based on the comparisons, the computing device may determine whether there has been an entry/leave event and/or may perform other operations based on that determination. After the determination, the computing device may retrieve another portion of the data from the buffer and perform another round of determinations.

For successive rounds of determinations, portions of the buffer retrieved may overlap with portions retrieved during a previous round. For example, if a buffer portion retrieved for a first round corresponds to times t(0) through t(n), a buffer portion retrieved for a second round (immediately following the first round) may correspond to times t(n-m) through t(2n-m), where m<n. Portions of the buffer retrieved may be contiguous with portions retrieved during previous rounds. For example, if a buffer portion retrieved for a first round corresponds to times t(0) through t(n), a buffer portion retrieved for a second round (immediately following the first round) may correspond to times t(n) through t(2n). Portions of the buffer retrieved may be offset from portions retrieved during previous rounds. For example, if a buffer portion retrieved for a first round corresponds to times t(0) through t(n), a buffer portion retrieved for a second round (immediately following the first round) may correspond to times t(n+m) through t(2n+m). The relationship between portions of the buffer retrieved for successive rounds may be varied. For example, during periods when an enter/leave event is more likely, buffer portions retrieved during successive rounds may overlap or may be contiguous. During periods when an enter/leave event is less likely, buffer portions retrieved during successive rounds may be offset. Also or alternatively, the size of retrieved buffer portions may vary.

In step 1008, the computing device may determine values, corresponding to a time period, for one or more of n communication parameters. The values for one communication parameters may, for example, comprise values for signal strength (e.g., RSSI) and/or for one or more other communication parameters described herein. As part of step 1008, the computing device may retrieve a portion of the buffer corresponding to the time period. The determined communication parameter values may be for one or more wireless communications of one or more wireless devices. If there are no activated wireless devices in a premises or other detection region for which the method of FIGS. 10A-10B is being performed, null and/or zero values may be determined as part of step 1008.

Steps 1009-1 through 1012 may correspond to the Ensemble Model Output 437 (FIG. 4B) and/or to the Final ML Model 436 (FIG. 4C). In each of steps 1009-1 through steps 1009-$n$, data associated with a different one of the n communication parameters is compared to one or more criteria, determined in step 1006, for that communication parameter. Although steps 1009-1 through 1009-$n$ (and steps 1010-1 through 1010-$n$) are shown as performed in parallel, one or more of steps 1009-1 through 1009-$n$ (and/or steps 1010-1 through 1010-$n$) may be performed serially. The comparison performed in each of steps 1009-1 through steps 1009-$n$ may depend on the communication parameter associated with that comparison and on the criteria determined for that parameter in step 1006. As discussed above, the comparison for a signal strength communication parameter may comprise comparing one or more signal strength change rates, determined from signal strength values determined in step 1008, to one or more criteria rates of change. Similar types of comparisons may be made for other communication parameters that may also have values that change continuously as separation distance increases or decreases. A comparison for an RF band communication parameter, and/or for other communication parameters that may have a limited number of discrete possible values, may comprise determining if a sequence of values corresponds to a sequence of values that indicates increasing or decreasing distance, that indicates travel along a particular path, or that otherwise indicates movement through a sensing region. For example, if an RF band parameter may have a value of 0 (indicating 2.4 GHZ) or 1 (indicating 5 GHz), the comparison may comprise determining if the values change from 0 to 1 (indicating a change from 2.4 GHz to 5 GHz and decreasing distance) or from 1 to 0 (indicating a change from 5 GHz to 2.4 GHz and increasing distance).

Based on the comparisons of steps 1009-1 through 1009-$n$, respective scores may be determined in steps 1010-1 through 1010-$n$. A score may comprise a value indicating an enter event or a value indicating a leave event. Also or alternatively, a larger range of possible scores may be available, with different values in the range indicating a probability of an enter/leave event. Some or all of steps 1010-1 through 1010-$n$ may also comprise applying a weight to a score. Weight may be used, for example, to emphasize scores based on one or more communication parameters having a higher correlation to true enter/leave events more than scores based on one or more other communication parameters having a lower correlation to true enter/leave events.

Although FIG. 10B shows comparison and score determination steps for each of n communication parameters, the method may alternatively include comparison and score determination steps based on a single communication parameter (e.g., a single step 1009 and a single step 1010) or based on a two communication parameters (e.g., a step 1009-1 and corresponding step 1010-1, and a step 1009-2 and corresponding step 1010-2).

In step 1011, a total score, for the time period associated with the most recent performance of steps 1008, 1009-1 through 1009-n, and 1010-1 through 1010-n may be determined based on the scores from steps 1010-1 through 1010-n. In step 1012, there may be a determination, based on the score from step 1011, of whether an enter event has occurred or whether a leave event has occurred.

As part of step 1012 (e.g., if an enter event is determined or if leave event is determined), the data used in one or more of the comparisons of steps 1009-1 through 1009-n may be compared to one or more patterns to determine additional information. For example a first wireless device may be associated with a first user and a second wireless device may be associated with a second user. The first user may typically enter or leave a premises via a first door and the second user may typically enter or leave the premises via a different second door. A first set of criteria may correspond to a pattern of movement for the first user entering or leaving the premises and a second set of criteria may correspond to a pattern of movement for the second user entering or leaving the premises. By comparing data obtained in step 1008 to the first and second criteria, and in addition to determining an enter/leave event, there may be a determination of that either the first or the second user has entered or left the premises.

If an enter event or a leave event is determined in step 1012, step 1013 may be performed. In step 1013, a flag and a timer may be set. After step 1013, step 1008 may be repeated. If neither an enter event nor a leave event is determined in step 1012, step 1014 may be performed. In step 1014, a determination may be made of whether the flag was set after a previous performance of step 1008-1012. If not, step 1008 may be repeated. If yes, step 1015 may be performed, and a determination may be made of whether a timer started in connection with setting of the flag has expired. If not, step 1008 may be repeated. If yes, step 1016 may be performed.

Setting a flag and timer in step 1013, and the determinations of steps 1014 and 1015, may allow avoidance of taking action based on border events. The timer value may be a predetermined time duration (e.g., 30 seconds, 1 minute, 2 minutes, 5 minutes, or another value) corresponding to an expected maximum time between enter/leave events of a border event (e.g., an expected maximum time between a leave event and a following enter event of a border event).

In step 1016, a message may be sent, based on the most recently detected enter/leave event, indicating that enter/leave event. The message may comprise a notification such as one of the notifications described in connection with FIGS. 9A and 9B. Also or alternatively, the message may comprise a message or signal sent to another system (e.g., a security system, a premises automation system, etc.) configured to cause that other system to perform an action. For example, a message sent to a security system may be configured to cause arming or disarming of that system. A message sent to a premises automation system may be configured to cause activation/deactivation of lighting, activation/deactivation of heating or air conditioning, locking/unlocking of doors, and/or other actions. Also or alternatively, one or more other actions may be performed as part of step 1015.

In step 1017, a determination may be made with regard to whether training performed in connection with steps 1001 through 1006 should be repeated and/or updated based determinations made since a previous performance of steps 1001 through 1006. Step 1017 may comprise determining if a time period (e.g., 1 month) has elapsed since a previous performance of steps 1001 through 1006. Also or alternatively, step 1017 may comprise determining if there have been indications that previous determinations of enter/leave events were incorrect. Also or alternatively, step 1017 may comprise determining if a user has requested that training be repeated/updated. If the determination in step 1017 is no, step 1008 may be repeated. If the determination in step 1017 is yes, step 1001 may be repeated. Data from performance of steps 1008 through 1012 after a training period may be stored (e.g., until training is repeated/updated). As part of repeating step 1001 from the "yes" branch from step 1017, such data may be added to the training data sets for the repeated/updated training.

Figure 11:
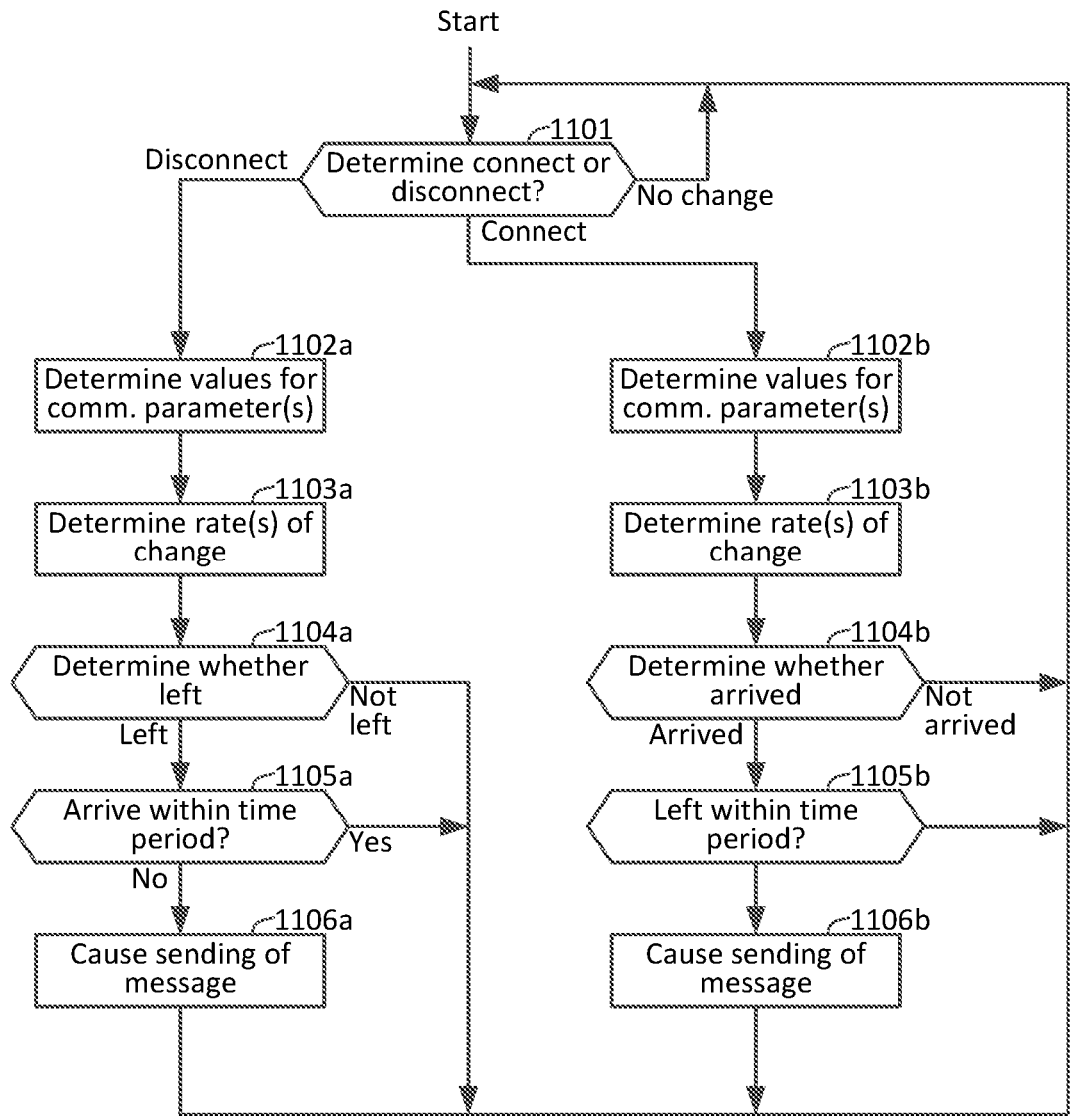
FIG. 11 is a flow chart showing an example method for performing presence detection.

FIG. 11 is a flow chart showing an example method for presence detection. The method of FIG. 11 may be performed as part of, separately from, the method of FIGS. 10A-10B. Steps of the method of FIG. 11 may be performed by a single computing device (e.g., the computing device 310) or may be distributed and performed by multiple computing devices. For example, some steps may be performed by one or more computing devices (e.g., the computing device 310) located at a premises, with other steps performed by one or more computing devices (e.g., presence determination server 122) located remotely from that premises. One, some, or all of the steps shown in FIG. 11 may be rearranged and/or otherwise modified. Steps may be omitted from, and/or other steps added to, the method of FIG. 11.

In step 1101, a determination may be made of whether a wireless device has connected to, or disconnected from, a computing device associated with a premises. If it is determined that no connection or disconnection has occurred, and as shown by the "no change" branch from step 1101, step 1101 may be repeated. If it is determined in step 1101 that the wireless device has disconnected from the computing device associated with the premises, step 1102a may be performed.

In step 1102a, values for one or more communication parameters, for wireless communications associated with the wireless device, may be determined. The communication parameters may comprise signal strength (e.g., RSSI) and/or one or more of the other communication parameters described herein. In step 1103a, one or more rates of change may be determined for the values determined in step 1102a.

In step 1104a, a determination may be made, based on the one or more rates of change determined in step 1103a, of whether the wireless device has left a coverage area associated with the premises. The coverage area may, for example, be a coverage area of the computing device associated with the premises (e.g., the such as the sensing region 320). The determination of step 1104a may comprise, for example, determining if one or more of the rates of change determined in step 1103a are gradual or abrupt. A gradual rate of change may comprise a rate of change associated with the wireless device moving away from a computing device (e.g., away from an access point, gateway, or other wireless node) at a speed consistent with the wireless device being carried by a user who is walking away from, running away from, and/or in a vehicle that is moving away from that computing device. An abrupt rate of change may comprise a rate of change that is greater than a rate of change that results from movement of the wireless device away from the computing device, and/or that is consistent with the wireless device being powered off and/or otherwise terminating a connection by means other than movement away from the computing device.

Determination of whether a rate of change is abrupt or gradual may be determined based on comparing that rate of change to one or more thresholds. A threshold may comprise, for example, a magnitude (corresponding, e.g., how quickly or slowly values are changing), a sign of the rate of change (corresponding, e.g., to whether values are increasing or decreasing), and/or a duration (corresponding, e.g., to a time period over which a rate of change is calculated). Whether a rate of change is gradual or abrupt may be determined based on satisfaction or non-satisfaction of one or more thresholds. For example, a rate of change determined in step 1103a may be compared to a threshold that is based on a magnitude of rate of change that is considered abrupt. If the rate of change determined in step 1103a satisfies that threshold, that rate of change may be determined to be abrupt. If the rate of change determined in step 1103a does not satisfy that threshold, that rate of change may be determined to be gradual. Determination of whether a rate of change is gradual or abrupt may require satisfaction of multiple thresholds (e.g., a threshold associated with duration, a threshold associated with sign, and/or a threshold associated with magnitude).

If the determination of step 1104a is that the wireless device has not left a coverage area associated with the premises (e.g., if one or more of the rates of change determined in step 1103a are determined to be abrupt), step 1101 may be repeated. If the determination of step 1104a is that the wireless device has left the coverage area associated with the premises (e.g., if one or more of the rates of change determined in step 1103a are determined to be gradual), step 1105a may be performed. In step 1105a, a determination may be made with regard to whether the wireless device as arrived at (e.g., re-entered) the coverage area within a predetermined time period. If yes, a border event may have occurred, and step 1101 may be repeated. If not, and as shown at step 1106a, sending of a message may be caused. That message may indicate whether the wireless device has left the coverage area and may, e.g., comprise a message such as one or more messages previously described herein. From step 1106a, step 1101 may be repeated.

If it is determined in step 1101 that the wireless device has connected to the computing device associated with the premises, step 1102b may be performed. In step 1102b, values for one or more communication parameters, for wireless communications associated with the device may be determined. In step 1103b, one or more rates of change may be determined for the values determined in step 1102b. In step 1104b, a determination may be made, based on the one or more rates of change determined in step 1103b, of whether the wireless device has arrived at (e.g., entered) the coverage area associated with the premises. The determination of step 1104b may comprise, for example, determining if one or more of the rates of change determined in step 1103b are gradual or abrupt. Determination of whether a rate of change of abrupt or gradual may be determined based on comparing that rate of change to one or more thresholds, as described above.

If the determination of step 1104b is that the wireless device has not arrived at a coverage area associated with the premises (e.g., if one or more of the rates of change determined in step 1103b are determined to be abrupt), step 1101 may be repeated. If the determination of step 1104b is that the wireless device has arrived at the coverage area associated with the premises (e.g., if one or more of the rates of change determined in step 1103b are determined to be gradual), step 1105b may be performed. In step 1105b, a determination may be made with regard to whether the wireless device as left the coverage area within a predetermined time period. If yes, a border event may have occurred, and step 1101 may be repeated. If not, and as shown at step 1106b, sending of a message may be caused. That message may indicate whether the wireless device has arrived at the coverage area and may, e.g., comprise a message such as one or more messages previously described herein. From step 1106b, step 1101 may be repeated.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by a computing device, based on one or more rates of change of values of a wireless parameter and based on connection of a wireless device to an access point, whether the wireless device arrived at a premises; and
   based on determining that the wireless device arrived at the premises, sending an indication that the wireless device arrived at the premises.

2. The method of claim 1, wherein the wireless parameter comprises: signal strength, packet loss, channel state information, quantity of retransmissions, bandwidth, quantity of packets transmitted, quantity of bytes transmitted, quantity of packets received, quantity of bytes received, physical layer rate, error rate, signal-to-noise ratio, or coding type.

3. The method of claim 1, wherein the determining whether the wireless device arrived at the premises is further based on the one or more rates of change satisfying one or more thresholds.

4. The method of claim 1, further comprising:
   determining, for each connection of a plurality of connections of the wireless device to the access point, post-connection values for the wireless parameter during a time period following the connection;
   determining, based on the post-connection values, criteria for rates of change associated with departure from the premises; and
   determining, based on receiving an indication that the wireless device has disconnected from the access point and based on comparing the criteria with one or more second rates of change of second values of the wireless parameter, whether the wireless device has departed from the premises.

5. The method of claim 1, wherein the determining whether the wireless device arrived at the premises comprises:
   determining, based on the one or more rates of change comprising one or more gradual rates of change, that the wireless device arrived at the premises.

6. The method of claim 1, wherein the determining whether the wireless device arrived at the premises is further based on use of a machine learning model that is configured to determine, based on the one or more rates of change, whether the wireless device arrived at the premises.

7. The method of claim 1, wherein the sending the indication comprises sending the indication to a second computing device that is different from a device of a user associated with the wireless device.

8. The method of claim 1, wherein the indication is configured to cause a security system to be disarmed.

9. The method of claim 1, further comprising:
determining values of one or more additional parameters for wireless communications associated with the wireless device; and
comparing one or more criteria, for the one or more additional parameters, with the values of the one or more additional parameters,
wherein the determining whether the wireless device arrived at the premises is further based on the comparing of the one or more criteria with the values of the one or more additional parameters.

10. The method of claim 1, wherein the computing device comprises one or more of:
the access point, or
a gateway located at the premises.

11. The method of claim 1, wherein the indication is configured to cause activation of a heating system or an air conditioning system.

12. The method of claim 1, further comprising:
determining, based on receiving an indication that the wireless device has connected to the access point and based on one or more second rates of change of second values of the wireless parameter, that the wireless device arrived at the premises; and
causing, based on the wireless device arriving at the premises, sending of a second indication that the wireless device arrived at the premises.

13. The method of claim 1, wherein the indication comprises a notification that a child has arrived at the premises.

14. The method of claim 1, further comprising:
determining, based on the one or more rates of change and based on states of connection of the wireless device to the access point, a quantity of times the wireless device arrived at the premises and left the premises within a time period,
wherein the sending the indication is further based on the quantity of times satisfying a threshold.

15. A computing device comprising:
one or more processors; and
memory storing instructions that, when executed by the one or more processors, cause the computing device to:
determine, based on one or more rates of change of values of a wireless parameter and based on connection of a wireless device to an access point, whether the wireless device arrived at a premises; and
based on determining that the wireless device arrived at the premises, send an indication that the wireless device arrived at the premises.

16. The computing device of claim 15, wherein the instructions, when executed by the one or more processors, cause the computing device to determine whether the wireless device arrived at the premises further based on the one or more rates of change satisfying one or more thresholds.

17. The computing device of claim 15, wherein the instructions, when executed by the one or more processors, further cause the computing device to:
determine, for each connection of a plurality of connections of the wireless device to the access point, post-connection values for the wireless parameter during a time period following the connection;
determine, based on the post-connection values, criteria for rates of change associated with departure from the premises; and
determine, based on receiving an indication that the wireless device has disconnected from the access point and based on comparing the criteria with one or more second rates of change of second values of the wireless parameter, whether the wireless device has departed from the premises.

18. The computing device of claim 15, wherein the wireless parameter comprises: signal strength, packet loss, channel state information, quantity of retransmissions, bandwidth, quantity of packets transmitted, quantity of bytes transmitted, quantity of packets received, quantity of bytes received, physical layer rate, error rate, signal-to-noise ratio, or coding type.

19. The computing device of claim 15, wherein the instructions, when executed by the one or more processors, cause the computing device to determine whether the wireless device arrived at the premises by:
determining, based on the one or more rates of change comprising one or more gradual rates of change, that the wireless device arrived at the premises.

20. The computing device of claim 15, wherein the instructions, when executed by the one or more processors, cause the computing device to determine whether the wireless device arrived at the premises further based on use of a machine learning model that is configured to determine, based on the one or more rates of change, whether the wireless device arrived at the premises.

21. The computing device of claim 15, wherein the instructions, when executed by the one or more processors, cause the computing device to send the indication by sending the indication to a second computing device that is different from a device of a user associated with the wireless device.

22. The computing device of claim 15, wherein the indication is configured to cause a security system to be disarmed.

23. The computing device of claim 15, wherein the instructions, when executed by the one or more processors, further cause the computing device to:
determine values of one or more additional parameters for wireless communications associated with the wireless device; and
compare one or more criteria, for the one or more additional parameters, with the values of the one or more additional parameters,
determine whether the wireless device arrived at the premises further based on the comparing of the one or more criteria with the values of the one or more additional parameters.

24. The computing device of claim 15, wherein the computing device comprises one or more of:
the access point, or
a gateway located at the premises.

25. The computing device of claim 15, wherein the indication is configured to cause activation of a heating system or an air conditioning system.

26. The computing device of claim 15, wherein the instructions, when executed by the one or more processors, further cause the computing device to:
determine, based on receiving an indication that the wireless device has connected to the access point and based on one or more second rates of change of second values of the wireless parameter, that the wireless device arrived at the premises; and cause, based on the wireless device arriving at the premises, sending of a second indication that the wireless device arrived at the premises.

27. The computing device of claim 15, wherein the indication comprises a notification that a child has arrived at the premises.

28. The computing device of claim 15, wherein the instructions, when executed by the one or more processors, further cause the computing device to:

determine, based on the one or more rates of change and based on states of connection of the wireless device to the access point, a quantity of times the wireless device arrived at the premises and left the premises within a time period, and send the indication further based on the quantity of times satisfying a threshold.

29. A non-transitory, computer-readable medium storing instructions that, when executed by a computing device, cause:

determining, based on one or more rates of change of values of a wireless parameter and based on connection of a wireless device to an access point, whether the wireless device arrived at a premises; and based on determining that the wireless device arrived at the premises, sending an indication that the wireless device arrived at the premises.

30. The non-transitory, computer-readable medium of claim 29, wherein the determining whether the wireless device arrived at the premises is further based on the one or more rates of change satisfying one or more thresholds.

31. The non-transitory, computer-readable medium of claim 29, wherein the instructions, when executed by the computing device, further cause:

determining, for each connection of a plurality of connections of the wireless device to the access point, post-connection values for the wireless parameter during a time period following the connection;

determining, based on the post-connection values, criteria for rates of change associated with departure from the premises; and determining, based on receiving an indication that the wireless device has disconnected from the access point and based on comparing the criteria with one or more second rates of change of second values of the wireless parameter, whether the wireless device has departed from the premises.

32. The non-transitory, computer-readable medium of claim 29, wherein the wireless parameter comprises: signal strength, packet loss, channel state information, quantity of retransmissions, bandwidth, quantity of packets transmitted, quantity of bytes transmitted, quantity of packets received, quantity of bytes received, physical layer rate, error rate, signal-to-noise ratio, or coding type.

33. The non-transitory, computer-readable medium of claim 29, wherein the instructions, when executed by the computing device, cause the determining whether the wireless device arrived at the premises by causing:

determining, based on the one or more rates of change comprising one or more gradual rates of change, that the wireless device arrived at the premises.

34. The non-transitory, computer-readable medium of claim 29, wherein the instructions, when executed by the computing device, cause the determining whether the wireless device arrived at the premises based on use of a machine learning model that is configured to determine, based on the one or more rates of change, whether the wireless device arrived at the premises.

35. The non-transitory, computer-readable medium of claim 29, wherein the instructions, when executed by the computing device, cause the sending the indication by causing sending the indication to a second computing device that is different from a device of a user associated with the wireless device.

36. The non-transitory, computer-readable medium of claim 29, wherein the indication is configured to cause a security system to be disarmed.

37. The non-transitory, computer-readable medium of claim 29, wherein the instructions, when executed by the computing device, further cause:

determining values of one or more additional parameters for wireless communications associated with the wireless device; and comparing one or more criteria, for the one or more additional parameters, with the values of the one or more additional parameters, wherein the determining whether the wireless device arrived at the premises is further based on the comparing of the one or more criteria with the values of the one or more additional parameters.

38. The non-transitory, computer-readable medium of claim 29, wherein the computing device comprises one or more of:

the access point, or a gateway located at the premises.

39. The non-transitory, computer-readable medium of claim 29, wherein the indication is configured to cause activation of a heating system or an air conditioning system.

40. The non-transitory, computer-readable medium of claim 29, wherein the instructions, when executed by the computing device, further cause:

determining, based on receiving an indication that the wireless device has connected to the access point and based on one or more second rates of change of second values of the wireless parameter, that the wireless device arrived at the premises; and causing, based on the wireless device arriving at the premises, sending of a second indication that the wireless device arrived at the premises.

41. The non-transitory, computer-readable medium of claim 29, wherein the indication comprises a notification that a child has arrived at the premises.

42. The non-transitory, computer-readable medium of claim 29, wherein the instructions, when executed by the computing device, further cause:

determining, based on the one or more rates of change and based on states of connection of the wireless device to the access point, a quantity of times the wireless device arrived at the premises and left the premises within a time period, wherein the sending the indication is further based on the quantity of times satisfying a threshold.

43. A system comprising:

a first computing device; and a second computing device, wherein the first computing device is configured to:

determine, based on one or more rates of change of values of a wireless parameter and based on connection of a wireless device to an access point, whether the wireless device arrived at a premises; and based on determining that the wireless device arrived at the premises, send an indication that the wireless device arrived at the premises, and wherein the second computing device is configured to: receive the indication.

44. The system of claim 43, wherein the first computing device is configured to determine whether the wireless device arrived at the premises further based on the one or more rates of change satisfying one or more thresholds.

45. The system of claim 43, wherein the first computing device is further configured to:

determine, for each connection of a plurality of connections of the wireless device to the access point, post-connection values for the wireless parameter during a time period following the connection;

determine, based on the post-connection values, criteria for rates of change associated with departure from the premises; and determine, based on receiving an indication that the wireless device has disconnected from the access point and based on comparing the criteria with one or more second rates of change of second values of the wireless parameter, whether the wireless device has departed from the premises.

46. The system of claim 43, wherein the wireless parameter comprises: signal strength, packet loss, channel state information, quantity of retransmissions, bandwidth, quantity of packets transmitted, quantity of bytes transmitted, quantity of packets received, quantity of bytes received, physical layer rate, error rate, signal-to-noise ratio, or coding type.

47. The system of claim 43, wherein the first computing device is configured to determine whether the wireless device arrived at the premises by:

determining, based on the one or more rates of change comprising one or more gradual rates of change, that the wireless device arrived at the premises.

48. The system of claim 43, wherein the first computing device is configured to determine whether the wireless device arrived at the premises further based on use of a machine learning model that is configured to determine, based on the one or more rates of change, whether the wireless device arrived at the premises.

49. The system of claim 43, wherein the first computing device is configured to send the indication by sending the indication to the second computing device that is different from a device of a user associated with the wireless device.

50. The system of claim 43, wherein the indication is configured to cause a security system to be disarmed.

51. The system of claim 43, wherein the first computing device is further configured to:

determine values of one or more additional parameters for wireless communications associated with the wireless device; and compare one or more criteria, for the one or more additional parameters, with the values of the one or more additional parameters, determine whether the wireless device arrived at the premises further based on the comparing of the one or more criteria with the values of the one or more additional parameters.

52. The system of claim 43, wherein the first computing device comprises one or more of:

the access point, or a gateway located at the premises.

53. The system of claim 43, wherein the indication is configured to cause activation of a heating system or an air conditioning system.

54. The system of claim 43, wherein the first computing device is further configured to:

determine, based on receiving an indication that the wireless device has connected to the access point and based on one or more second rates of change of second values of the wireless parameter, that the wireless device arrived at the premises; and cause, based on the wireless device arriving at the premises, sending of a second indication that the wireless device arrived at the premises.

55. The system of claim 43, wherein the indication comprises a notification that a child has arrived at the premises.

56. The system of claim 43, wherein the first computing device is further configured to:

determine, based on the one or more rates of change and based on states of connection of the wireless device to the access point, a quantity of times the wireless device arrived at the premises and left the premises within a time period, and send the indication further based on the quantity of times satisfying a threshold.

* * * * *